(12) United States Patent
Fujihara et al.

(10) Patent No.: US 11,101,707 B2
(45) Date of Patent: Aug. 24, 2021

(54) RARE-EARTH PERMANENT MAGNET AND ROTARY MACHINE INCLUDING RARE-EARTH PERMANENT MAGNET

(71) Applicant: NITTO DENKO CORPORATION, Osaka (JP)

(72) Inventors: Makoto Fujihara, Osaka (JP); Kenichi Fujikawa, Osaka (JP); Takashi Yamamoto, Osaka (JP); Shoichiro Saito, Osaka (JP)

(73) Assignee: NITTO DENKO CORPORATION, Ibaraki (JP)

( * ) Notice: Subject to any disclaimer, the term of this patent is extended or adjusted under 35 U.S.C. 154(b) by 544 days.

(21) Appl. No.: 15/560,813

(22) PCT Filed: Mar. 24, 2016

(86) PCT No.: PCT/JP2016/059391
§ 371 (c)(1),
(2) Date: Sep. 22, 2017

(87) PCT Pub. No.: WO2016/152976
PCT Pub. Date: Sep. 29, 2016

(65) Prior Publication Data
US 2018/0115205 A1    Apr. 26, 2018

(30) Foreign Application Priority Data

Mar. 24, 2015 (JP) .............................. JP2015-061080
Mar. 1, 2016  (JP) .............................. JP2016-039116

(51) Int. Cl.
*H02K 1/27*    (2006.01)
*B22F 3/105*   (2006.01)
(Continued)

(52) U.S. Cl.
CPC ........... *H02K 1/2766* (2013.01); *B22F 3/105* (2013.01); *C22C 38/005* (2013.01);
(Continued)

(58) Field of Classification Search
CPC ...... B22F 3/105; C22C 38/005; H01F 1/0536; H01F 1/0577; H01F 1/086;
(Continued)

(56) References Cited

U.S. PATENT DOCUMENTS 5,808,381 A    9/1998  Aoyama et al.
5,945,760 A    8/1999  Honda et al.
(Continued)

FOREIGN PATENT DOCUMENTS

CN    101123386 A    2/2008
JP    S57-2801 A     1/1982
(Continued)

OTHER PUBLICATIONS

Partial Translation of JP2010-200459A (Year: 2010).*
(Continued)

*Primary Examiner* — Bernard Rojas
(74) *Attorney, Agent, or Firm* — Hauptman Ham, LLP

(57) ABSTRACT

This invention provides for a rare-earth permanent magnet-forming sintered body obtained by integrally sintering magnet material particles containing a rare-earth substance while shaping the magnet material particles, a rare-earth permanent magnet obtained by magnetizing the sintered body, and a rotary machine in which the permanent magnet is embedded.

10 Claims, 9 Drawing Sheets

(51) Int. Cl.
  *H02K 15/03* (2006.01)
  *H01F 7/02* (2006.01)
  *H02K 1/22* (2006.01)
  *C22C 38/00* (2006.01)
  *H01F 1/053* (2006.01)
  *H01F 1/057* (2006.01)
  *H01F 1/08* (2006.01)
  *H01F 41/02* (2006.01)

(52) U.S. Cl.
  CPC ......... *H01F 1/0536* (2013.01); *H01F 1/0577* (2013.01); *H01F 1/086* (2013.01); *H01F 7/02* (2013.01); *H02K 1/22* (2013.01); *H02K 1/27* (2013.01); *H02K 15/03* (2013.01); *H01F 41/0273* (2013.01)

(58) Field of Classification Search
  CPC ......... H01F 41/0273; H01F 7/02; H02K 1/22; H02K 1/27; H02K 1/2766
  USPC ................................................. 335/302–306
  See application file for complete search history.

(56) References Cited

U.S. PATENT DOCUMENTS

| | | | |
|---|---|---|---|
| 6,218,753 | B1 | 4/2001 | Asano et al. |
| 6,304,162 | B1 | 10/2001 | Nakatsuka et al. |
| 9,281,107 | B2 | 3/2016 | Taihaku et al. |
| 9,991,033 | B2 | 6/2018 | Taihaku et al. |
| 9,991,034 | B2 | 6/2018 | Taihaku et al. |
| 2005/0076973 | A1 | 4/2005 | Masuzawa et al. |
| 2006/0113857 | A1 | 6/2006 | Honkura et al. |
| 2008/0231989 | A1 | 9/2008 | Oki et al. |
| 2009/0007417 | A1 | 1/2009 | Yamashita et al. |
| 2009/0127960 | A1 | 5/2009 | Kawamura et al. |
| 2012/0032537 | A1 | 2/2012 | Yamashita et al. |
| 2012/0262019 | A1 | 10/2012 | Smith et al. |
| 2012/0262020 | A1 | 10/2012 | Smith et al. |
| 2013/0214631 | A1 | 8/2013 | Smith et al. |
| 2013/0285778 | A1 | 10/2013 | Taihaku et al. |
| 2013/0328453 | A1 | 12/2013 | Duncan et al. |
| 2014/0145808 | A1 | 5/2014 | Kume et al. |
| 2015/0357870 | A1* | 12/2015 | Hazeyama ............ H02K 1/2766 310/156.07 |
| 2016/0141100 | A1 | 5/2016 | Taihaku et al. |
| 2016/0196903 | A1 | 7/2016 | Taihaku et al. |
| 2016/0247616 | A1 | 8/2016 | Smith et al. |

FOREIGN PATENT DOCUMENTS

| | | |
|---|---|---|
| JP | S61-69104 A | 4/1986 |
| JP | H02-308512 A | 12/1990 |
| JP | H04-098804 A | 3/1992 |
| JP | H8-107665 A | 4/1996 |
| JP | H08-331783 | 12/1996 |
| JP | 10-271722 | 10/1998 |
| JP | 2000-050543 | 2/2000 |
| JP | 2001-6924 A | 1/2001 |
| JP | 2003-318012 A | 11/2003 |
| JP | 2004-031780 A | 1/2004 |
| JP | 2005-44820 A | 2/2005 |
| JP | 2006-087204 A | 3/2006 |
| JP | 3864986 B2 | 10/2006 |
| JP | 2008-252968 A | 10/2008 |
| JP | 2009-142144 A | 6/2009 |
| JP | 2009-254143 | 10/2009 |
| JP | 2009-284740 A | 12/2009 |
| JP | 2010-104136 A | 5/2010 |
| JP | 2010-200459 | 9/2010 |
| JP | 2011-109004 A | 6/2011 |
| JP | 2013-191611 A | 9/2013 |
| JP | 5444630 | 3/2014 |
| JP | 2015-032669 A | 2/2015 |
| TW | 201301312 A | 1/2013 |
| WO | 2007/119393 | 8/2009 |
| WO | 2012/176509 A1 | 12/2012 |
| WO | 2013/175730 A1 | 11/2013 |
| WO | 2015-015586 A1 | 2/2015 |

OTHER PUBLICATIONS

Partial translation of JP2009-254143A (Year: 2009).*
International Search Report and Written Opinion of the International Searching Authority dated Jun. 28, 2016, which issued during prosecution of International Application No. PCT/JP2016/059391.
Chinese Office Action dated Jan. 24, 2019 for corresponding Chinese Application No. 201680017887.2, with its English translation.
The extended European search report for corresponding European application No. 16768879.5 dated Dec. 6, 2018.
Japanese Office Action dated Aug. 26, 2019 for corresponding Japanese Application No. 2017-508422.
Japanese Office Action dated Sep. 9, 2019 for corresponding Japanese Application No. 2017-508423.
Japanese Office Action dated Sep. 17, 2019 for corresponding Japanese Application No. 2017-508424.
Japanese Office Action dated Jun. 10, 2019 for corresponding Japanese Application No. 2017-508425.
Taiwanese Office Action dated Dec. 26, 2018 for corresponding Taiwanese Application No. 105109041.
Office Action issued in corresponding Japanese Patent Application No. 2017-508422 dated Jun. 1, 2020 along with a machine translation, 6 pages.
Office Action issued in corresponding Japanese Patent Application No. 2017-508423 dated Jun. 1, 2020 along with a machine translation, 9 pages.
Office Action issued in corresponding Japanese Patent Application No. 2017-508424 dated Jun. 1, 2020 along with a machine translation, 4 pages.
Office Action issued for corresponding Japanese Patent Application No. 2018-101818 dated Oct. 1, 2020, along with an English machine translation.
Japanese Office Action dated Feb. 28, 2020 corresponding to Japanese Application No. 2018-101818.
Japanese Office Action dated Mar. 9, 2021, in connection with the Japanese Patent Application No. 2017-508422.
Japanese Office Action dated Mar. 9, 2021, in connection with the Japanese Patent Application No. 2017-508423.

* cited by examiner (a)

(b)

(a)

(b) 115, 116

(c) Magnetic powder Binder — 117

(d) 118, 119, Heating, 120, 117

RARE-EARTH PERMANENT MAGNET AND ROTARY MACHINE INCLUDING RARE-EARTH PERMANENT MAGNET

RELATED APPLICATIONS AND INCORPORATION BY REFERENCE

The present patent application is filed pursuant to 35 U.S.C. § 371 as a U.S. National Phase Application of International Patent Application No. PCT/JP2016/059391 filed on Mar. 24, 2016, claiming the benefit of priority to Japanese Patent Application Nos. 2015-061080 filed on Mar. 24, 2015 and 2016-039116 filed Mar. 1, 2016. The International Application was published as WO 2016/152976 on Sep. 29, 2016. The contents of each of the aforementioned patent applications are herein incorporated by reference in their entirety.

TECHNICAL FIELD

The present invention relates to a rare-earth permanent magnet, and a rotary machine (rotating machine), such as an electric motor or a power generator, provided with a rare-earth permanent magnet. The present invention also relates to a rare-earth permanent magnet-forming sintered body having a structure obtained by integrally sintering magnet material particles containing a rare-earth substance and capable of forming a rare-earth permanent magnet by magnetizing the magnet material particles.

BACKGROUND ART

As one type of an electric motor comprising a stator and a rotor, there has been known a permanent magnet-embedded electric motor configured such that a permanent magnet is embedded in a rotor core to allow for utilizing reluctance torque in addition to magnet torque, as disclosed, for example, in JP H08-331783 A (Patent Document 1). In this type of electric motor, a rotor is disposed to be opposed to a stator having a plurality of magnetic poles through an air gap. The rotor core is formed with a plurality of permanent magnet-insertion slots at respective positions equally spaced from each other in a circumferential direction thereof, wherein widthwise opposite ends of each of the slots is located at a position adjacent to an outer peripheral surface of the rotor core. Thus, a permanent magnet inserted into the slot is disposed such that widthwise opposite ends thereof is also located at a position closer to the outer peripheral surface of the rotor core than a widthwise central portion thereof.

In JP 2000-50543 A (Patent Document 2), the above type of electric motor is pointed out to have a problem that, when a high-density concentrated winding is applied to an array of teeth of the stator so as to downsize the electric motor, a magnetic force of each of the teeth is increased, and therefore a magnetic flux flowing between adjacent ones of the teeth can reach the position of the permanent magnet in the rotor core to thereby cause demagnetization in the permanent magnet. According to the Patent Document 2, this demagnetizing action is exerted particularly against the ends of the permanent magnet. In order to address this problem, the Patent Document 2 proposes to provide a non-magnetic region between the outer peripheral surface of the rotor core and each of the ends of the permanent magnet embedded in the rotor core. As a specific example of the non-magnetic region, the Patent Document 2 teaches to extend each of the ends of the slot to provide a void space at each of the ends of the permanent magnet. By providing the non-magnetic region in this manner, the magnetic flux from the stator is forced to pass through the non-magnetic region, so that it becomes possible to suppress the demagnetization in the permanent magnet embedded in the rotor core. JP H10-271722 A (Patent Document 3) as a document disclosing another technique for addressing this demagnetization proposes that each of the ends of the permanent magnet is made of a magnet material having a high coercive force.

In the above Patent Documents 2 and 3, the permanent magnet is a ferrite magnet. However, the demagnetization problem pointed out by these Patent Documents is considered to also occur in an electric motor using a rare-earth magnet. JP 5444630 B (Patent Document 4) discloses a permanent magnet-embedded electric motor using an Nd—Fe—B based magnet as a permanent magnet. In the Patent Document 4, the permanent magnet is formed in a flat plate shape having two principal surfaces, wherein an outwardly-facing surface and an inwardly-facing surface, when viewed from a center of a rotor core, are, respectively, a magnetic pole surface exhibiting a magnetic pole with respect to the rotor core, and a reverse magnetic pole surface. In a state in which the permanent magnet is embedded in the rotor core, each of widthwise opposite ends of the permanent magnet is located at a position closer to an air gap than an intermediate portion thereof, and therefore called "near area", and the intermediate portion is called "far area" which is farther away from the air gap than the near area. This Patent Document 4 discloses a configuration for addressing the demagnetization occurring at the widthwise opposite ends of the permanent magnet. Specifically, the permanent magnet is configured such that each of the ends thereof is formed with an inclined edge surface to enable a cross-section of the permanent magnet to become an approximately trapezoidal shape, and the rotor core is configured such that it is formed with a void space at a position widthwise outside each of the ends of the permanent magnet. This void space is explained as having an effect of increasing a magnetic resistance between each of the ends of the permanent magnet and a rotor segment opposed to the permanent magnet via the void space. In a specific example, the void space is formed such that it is bent to extend in a direction toward the air gap, obliquely with respect to a slot formed in the rotor core so as to allow the permanent magnet to be embedded therein.

In the Patent Document 4, there is an additional description about orientations of easy magnetization axes in the permanent magnet. Specifically, in a lengthwise central portion of the permanent magnet, easy magnetization axes of a material of the permanent magnet are directed in a radial direction of a rotor. On the other hand, at positions away from the central portion, easy magnetization axes are inclined toward the central portion in both the near area and the far area, and an inclination angle thereof gradually increases in a direction from the central portion toward each of the ends.

International Publication WO 2007/119393 A (Patent Document 5) discloses a technique of controlling orientations of easy magnetization axes in a neodymium magnet. In this Patent Document 5, there is described a method which comprises subjecting a compound (mixture) of magnet material particles and a binder to pressure forming, and mechanically stretching the resulting cross-linked molecules of the binder to convert a direction of anisotropy to a radial direction by means of plastic deformation of a stretched vertically-anistoropic thin-plate magnet. The method taught herein uses a compound composed of magnet material particles, a reticulated polymer for immobilizing the magnet material particles, a linear polymer, and an additive to be used on an as-needed basis. The above polymers are composed of a magnet material particle-immobilizing phase A and a flowable phase B. Part of the phase B is chemically combined with the phase A to immobilize a group of the immobilizing phases A in a reticulated pattern, and deformation is cased in the phase B by shear flow and elongation flow thereof. Further, a magnet produced by the deformation of the phase B involving flow is subjected to heat treatment to progress the cross-linking reaction and thus cause the flowability of the phase B, thereby improving mechanical strength and heat resistance of the magnet. In this method, orientations of easy magnetization axes of the magnet material particles are controlled by the above flow deformation. A magnet to be produced by the technique disclosed in the Patent Document 5 is understood to be not a sintered magnet obtained by sintering neodymium magnet material particles, but a sort of a bonded magnet in which a polymer material remains without change. In the bonded magnet, the polymer material, i.e., binder, lies among the magnet material particles, and thereby a content rate of the magnet material particles is reduced. This leads to a disadvantage of lowering in residual magnetic flux density.

CITATION LIST

Parent Document

Patent Document 1: JP H08-331783 A
Patent Document 2: JP 2000-50543 A
Patent Document 3: JP H10-271722 A
Patent Document 4: JP 5444630 B
Patent Document 5: WO 2007/119393 A

SUMMARY OF INVENTION

Technical Problem

The present invention addresses a technical problem of, in a permanent magnet-embedded rotary machine, providing a means to solve a demagnetization problem encountered by a permanent magnet embedded therein.

The present invention also addresses another technical problem of providing a rare-earth permanent magnet or a rare-earth permanent magnet-forming sintered body capable of preventing or significantly easing the demagnetization problem when embedded in a rotary machine Solution to Technical Problem In order to solve the above technical problems, according to a first aspect of the present invention, there is provided a rare-earth permanent magnet-forming sintered body. The sintered body comprises particles of a magnet material containing a rare-earth substance. The magnet material particles are integrally sintered while being formed into a given three-dimensional shape with a lengthwise cross-section having a first surface extending in a length direction thereof, a second surface lying at a distance from the first surface in a thickness direction thereof and extending in the length direction, and edge surfaces of lengthwise opposite ends thereof, wherein each of the edge surfaces is inclined to extend from a corresponding lengthwise edge of the first surface obliquely outwardly in the length direction, whereby a length of the first surface becomes less than that of the second surface. The sintered body is sectionalized into at least a lengthwise central region, and first and second end regions located, respectively, on both sides of the central region. In the central region, easy magnetization axes of the magnet material particles included in the central region have a parallel orientation in which the easy magnetization axes are oriented in a direction substantially orthogonal to the first surface of the sintered body extending in the length direction. In each of the first and second end regions, easy magnetization axes of the magnet material particles included in the end region are oriented such that: at a position adjacent to the edge surface, they are directed toward the first surface at an angle inclined with respect to the first surface along an inclination of the edge surface; at a position adjacent to the central region, they are directed toward the first surface in a direction substantially orthogonal to the first surface; and at a position between the edge surface and the central region, they are converged in such a manner as to be directed toward the first surface at an inclination angle which gradually decreases in a direction from the edge surface toward the central region. In one preferred embodiment of the first aspect of the present invention, the edge surface in each of the first and second end regions is formed in a shape inclined with respect to the first surface, such that an angle between an extension of the edge surface and the first surface falls within the range of 45° to 80°, preferably 55° to 80°. In another preferred embodiment of the first aspect of the present invention, the central region is set such that a ratio P/L of a lengthwise dimension P of the central region to a lengthwise dimension L of the first surface is in the range of 0.05 to 0.8, preferably, 0.2 to 0.5, more preferably 0.3 to 0.4. Preferably, in the present invention, the magnet material is an Nd—Fe—B based magnet material.

According to a second aspect of the present invention, there is provided a rare-earth permanent magnet formed by magnetizing the above rare-earth permanent magnet-forming sintered body.

According to a third aspect of the present invention, there is provided a rotary machine such as an electric motor or a power generator. This rotary machine comprises a rotary shaft, a stator, and a rotor core rotatably disposed inside the stator and in opposed relation to the stator through an approximately hollow cylindrical-shaped air gap having a central axis parallel to the rotary shaft. The rotor core is formed with a plurality of slots each having a lengthwise cross-section with a lengthwise dimension and a thicknesswise dimension and extending in an axial direction, wherein the slots are arranged at positions spaced apart from each other in a circumferential direction of the rotor core; and the above rare-earth permanent magnet which is disposed inside each of the slots. In one preferred embodiment of the third aspect of the present invention, the lengthwise dimension of each of the slots is set to be greater than a widthwise dimension of the rare-earth permanent magnet disposed in the slot, so as to form a void space by the slot around each of lengthwise opposite ends of the rare-earth permanent magnet disposed inside the slot. Preferably, this void space extends in a direction toward the air gap with an inclination with respect to a portion of the slot receiving therein the permanent magnet.

Effect of Invention

In the rare-earth permanent magnet-forming sintered body of the present invention, the magnet material particles are integrally sintered while being formed into the given three-dimensional shape with the lengthwise cross-section having a length direction and a thickness direction, wherein each of the lengthwise opposite ends are inclined to extend from the corresponding lengthwise edge of the first surface obliquely outwardly in the length direction, whereby the length of the first surface becomes less than that of the second surface. The sintered body is sectionalized into at least a lengthwise central region, and first and second end regions located, respectively, on both sides of the central region, wherein, in the central region, easy magnetization axes of the magnet material particles included in the central region have a parallel orientation in which the easy magnetization axes are oriented in a direction substantially orthogonal to the first surface of the sintered body extending in the length direction. Further, in each of the first and second end regions, easy magnetization axes of the magnet material particles included in the end region are oriented such that: at a position adjacent to the edge surface, they are directed toward the first surface while being inclined with respect to the first surface at an angle conforming to an inclination angle of the edge surface; at a position adjacent to the central region, they are directed toward the first surface in a direction substantially orthogonal to the first surface; and, at a position between the edge surface and the central region, they are converged in such a manner as to be directed toward the first surface at an inclination angle which gradually increases in a direction from the edge surface toward the central region. The easy magnetization axes of the magnet material particles are oriented in this manner. In this case, when a rare-earth permanent magnet is formed by magnetizing this sintered body, a magnetic flux density formed in the permanent magnet becomes greater in each of the first and second end regions, i.e., the opposite ends, than in the central region. Thus, when the permanent magnet is used in a rotary machine such as a permanent magnet-embedded electric motor, it becomes possible to generate a magnetic flux having a sufficient density in the end regions, even in a situation where an external magnetic field exerting a demagnetization action is applied to the end regions of the permanent magnet.

The above feature of the present invention may be used in combination with the demagnetization measure described in the Patent Document 4. This provides further enhanced effects. That is, in a rotary machine such as an electric motor in which the rare-earth permanent magnet of the present invention is embedded, the void space as described in the Patent Document 4 may be provided around each of the lengthwise opposite ends of the permanent magnet to further increase the anti-demagnetization effect.

BRIEF DESCRIPTION OF DRAWINGS

FIG. 1 is a cross-sectional view depicting one example of a rare-earth permanent magnet-forming sintered body according to one embodiment of the present invention, wherein FIG. 1(a) depicts an entirety thereof, and FIG. 1(b) depicts part of an end region.

FIG. 7 is a schematic diagram depicting a production process of the permanent magnet-forming sintered body depicted in FIG. 1, wherein FIGS. 7(a) to (d) depict respective steps for forming a green sheet.

FIG. 8 is a sectional view depicting a processing sheet piece to explain orientation treatment for easy magnetization axes of magnet material particles in the example in FIG. 7, wherein FIG. 8(a) depicts a cross-sectional shape of the sheet piece during magnetic field application, and FIG. 8(b) depicts a cross-sectional shape of the sintering sheet piece after being subjected to deformation treatment after the magnetic field application.

FIG. 12 depicts a sintered body together with presents coordinate axes for the measurement of orientation angles of easy magnetization axes in the sintered body, wherein FIG. 12(a) is a perspective view, and FIG. 12(b) is an end view.

DESCRIPTION OF EMBODIMENTS

With reference to the drawings, an embodiment of the present invention will now be described. FIGS. 1 to 4 depict one example of a rare-earth permanent magnet-forming sintered body according to one embodiment of the present invention and one example of an electric motor incorporating a permanent magnet formed from the sintered body. In this example, a rare-earth permanent magnet 1 contains an Nd—Fe—B based magnet material as a magnet material. Typically, the Nd—Fe—B based magnet material contains 27 to 40 wt % of Nd, 0.8 to 2 wt % of B, and 60 to 70 wt % of Fe (electrolytic iron). With a view to improving magnetic properties, this magnet material may contain a small amount of one or more other elements, such as Dy, Tb, Co, Cu, Al, Si, Ga, Nb, V, Pr, Mo, Zr, Ta, Ti, W, Ag, Bi, Zn, and/or Mg.

Figure 1:
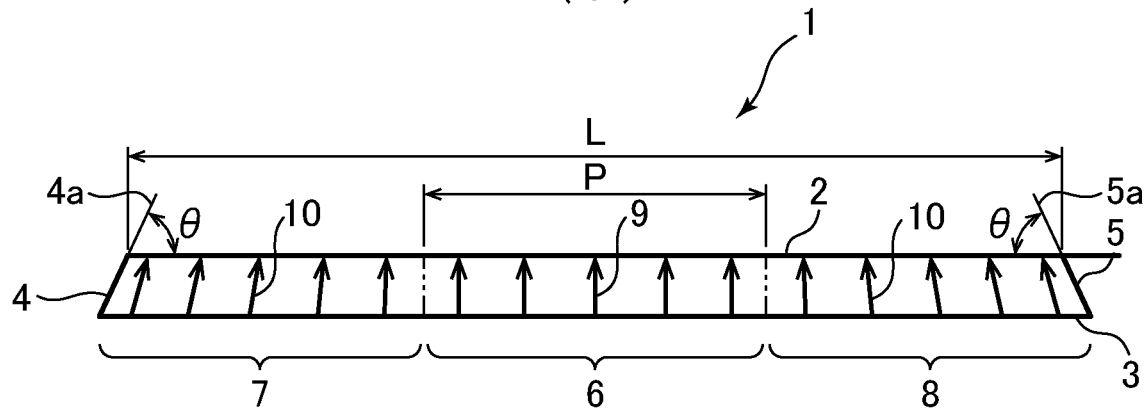
Figure 1:
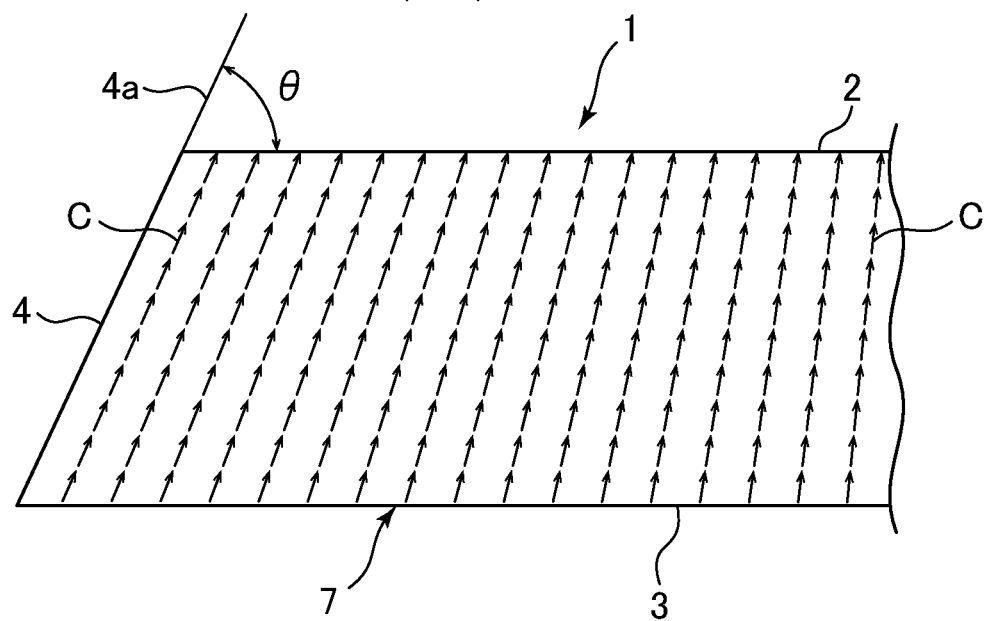

Referring to FIG. 1(*a*), the permanent magnet-forming sintered body 1 according to this embodiment is obtained by integrally sintering fine particles of the above magnet material while forming the magnet material particles into a given shape, wherein the sintered body has: an upper side 2 and a lower side 3 parallel to each other; and respective edge surfaces 4, 5 of left and right opposite ends thereof, and wherein each of the edge surfaces 4, 5 is formed as an inclined surface inclined with respect to the upper side 2 and the lower side 3. The upper side 2 is a side corresponding to a cross-section of a first surface set forth in the appended claim, and the lower side 3 is a side corresponding to a cross-section of a second surface set forth in the appended claim. An inclination angle of each of the edge surfaces 4, 5 (edge surface inclination angle) is defined as an angle $\theta$ between the upper side 2 and an extension (4*a*, 5*a*) of the edge surface (4, 5). In a preferred embodiment, the inclination angle $\theta$ is in the range of 45° to 80°, preferably in the range of 55° to 80°. As a result, the permanent magnet-forming sintered body 1 is formed in a shape having a lengthwise section of a trapezoid in which the upper side 2 is shorter than the lower side 3.

In a length direction along the upper side 2 and the lower side 3, the permanent magnet-forming sintered body 1 has a plurality of regions sectionalized into a central region 6 having a given length, and two end regions 7, 8 each on the side of a respective one of the left and right opposite ends thereof. In the central region 6, easy magnetization axes of the magnet material particles included in the central region 6 have a parallel orientation in which the easy magnetization axes are oriented parallel to a thickness direction substantially orthogonal to the upper side 2 and the lower side 3. On the other hand, in each of the end regions 7, 8, easy magnetization axes of the magnet material particles included in the end region (7, 8) are oriented in directions each extending upwardly while inclining toward the central region 6 with respect to the thickness direction, wherein an angle of the inclination is set such that: at a position adjacent to each of the edge surfaces 4, 5, it conforms to the inclination angle $\theta$ of each of the edge surfaces 4, 5; at a position adjacent to the central region 6, it is approximately orthogonal to the upper side 2; and it gradually increases in a direction extending from a position adjacent to each of the edge surfaces 4, 5 to come close to the central region 6. As regards the orientations of the easy magnetization axes, the parallel orientation in the central region 6 and an oblique or inclined orientation in each of the end regions 7, 8 are indicated, respectively, by the arrowed lines 9 and the arrowed lines 10. Expressing the inclined orientation in each of the end regions 7, 8 differently, easy magnetization axes of the magnet material particles included in the end region are oriented so as to be converged in a region having a given length corresponding to a lengthwise dimension of the end region 7, 8 extending from a corner at which the upper side 2 and the edge surface 4, 5 intersect each other, to the central region. As a result of this inclined orientation, in each of the end regions 7, 8, a density of the magnet material particles whose easy magnetization axes are directed toward the upper side 2 becomes greater than that in the central region 6. In a preferred embodiment of the present invention, respective lengths of the central region 6 and each of each of the end regions 7, 8 is set such that a ratio of a lengthwise dimension of part of the upper side 2 corresponding to the central region 6, i.e., a parallel length P, to a lengthwise dimension L of the upper side 2, i.e., a parallel ratio P/L, falls within the range of 0.05 to 0.8, preferably 0.2 to 0.5.

FIG. 1(*b*) exaggeratingly depicts the end region 7 for explain the orientations of the easy magnetization axes of the magnet material particles in the end regions 7, 8. Referring to FIG. 1(*b*), in an area adjacent to the edge surface 4, the easy magnetization axis of each of the magnet material particles is oriented approximately along the edge surface 4, i.e., to be inclined at an angle approximately conforming to the inclination angle $\theta$ of the edge surface 4. The inclination angle gradually increases in positions closer to the central region than that in the edge surface. That is, the orientations of the easy magnetization axes C of the magnet material particles are converged in a direction from the lower side 3 toward the upper side 2, so that a density of the magnet material particles whose easy magnetization axes C are directed toward the upper side 2 is increased, as compared to the region having the parallel orientation.

Figure 2:
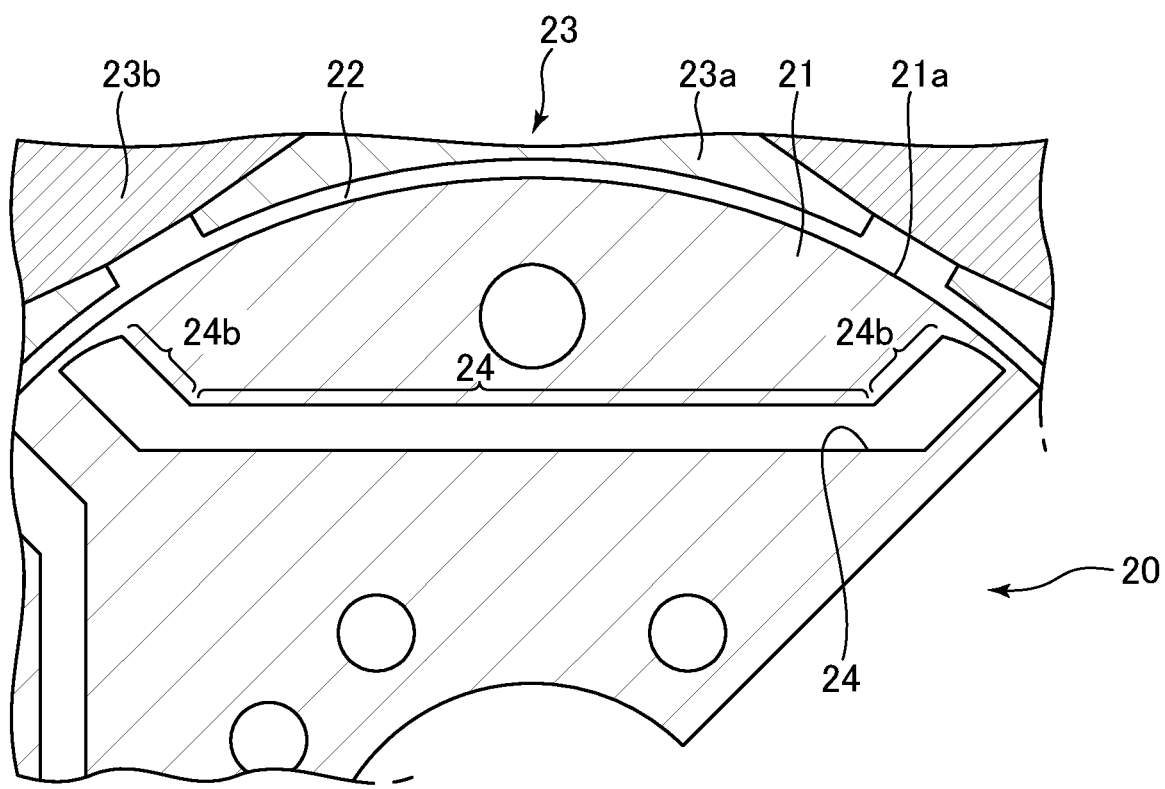
FIG. 2 is a sectional view depicting a rotor segment to explain one example of a magnet-insertion slot provided in a rotor core of an electric motor and configured to allow a permanent magnet formed using the present invention to be embedded therein.

FIG. 2 is sectional view enlargedly depicting a rotor core segment of an electric motor 20 suited to embeddedly using a rare-earth magnet formed by magnetizing the permanent magnet-forming sintered body 1 having the easy magnetization axes oriented in the above manner. A rotor core 21 is rotatably disposed inside a stator 23 such that an outer peripheral surface 21*a* of the rotor core 21 is opposed to the stator 23 through an air gap 22. The stator 23 comprises a plurality of teeth 23*a* arranged at intervals in a circumferential direction thereof. A field coil 23*a* is wound around each of the teeth 23*a*. The air gap 22 is formed between edge faces of the teeth 23*a* and the outer peripheral surface 21*a* of the rotor core 21. The rotor core 21 is formed with a magnet-insertion slot 24. This slot 24 has a linear central section 24*a*, and a pair of inclined sections 24*b* each extending obliquely from a respective one of opposite ends of the central section 24*a* toward the outer peripheral surface 21*a* of the rotor core 21. As seen from FIG. 2, the inclined section 24*b* is formed such that a distal end thereof is located at a position adjacent to the outer peripheral surface 21*a* of the rotor core 21.

Figure 3:
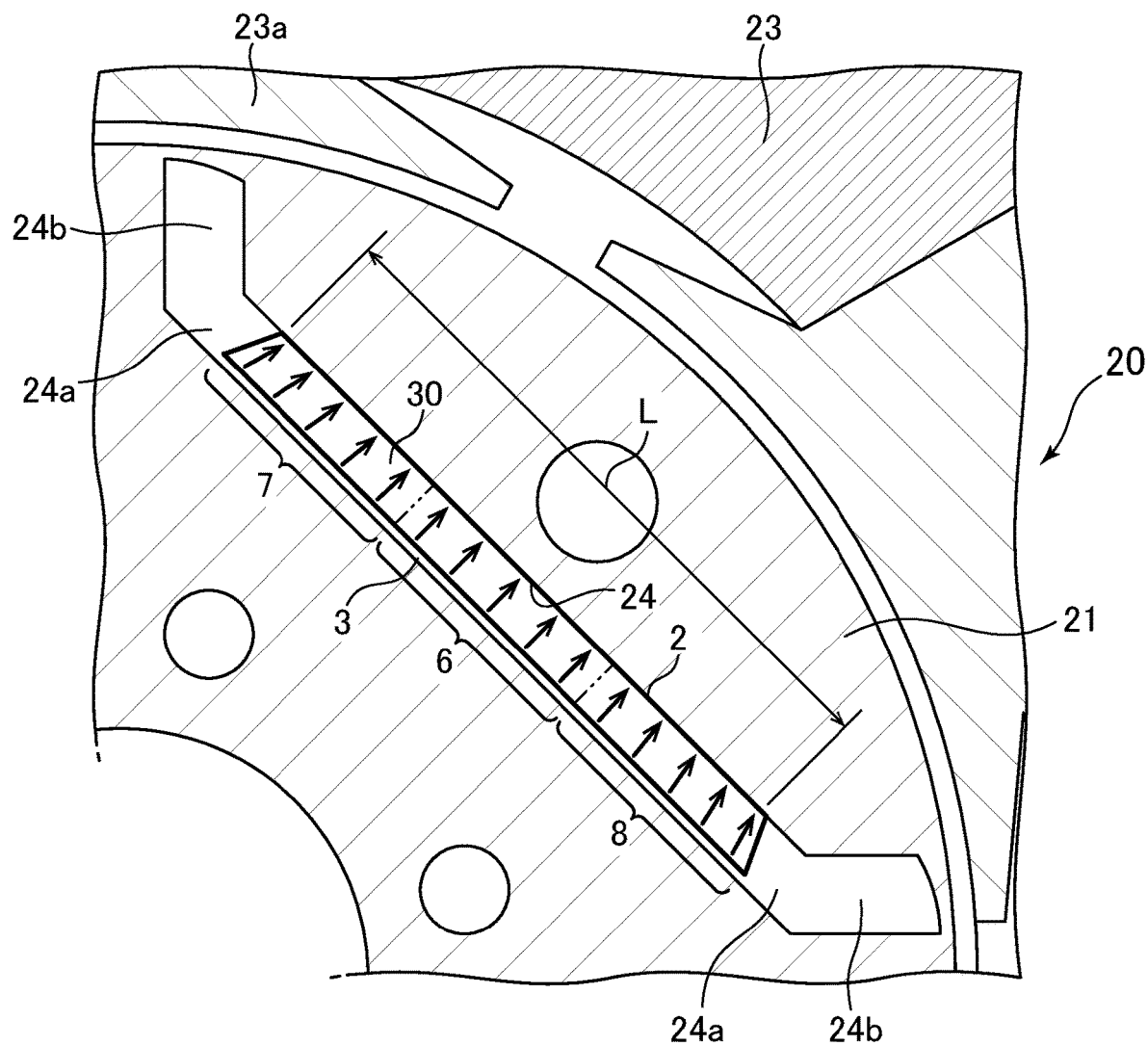
FIG. 3 is an end view depicting the rotor segment to explain a state after the permanent magnet is embedded in the rotor core depicted in FIG. 2.
Figure 4:
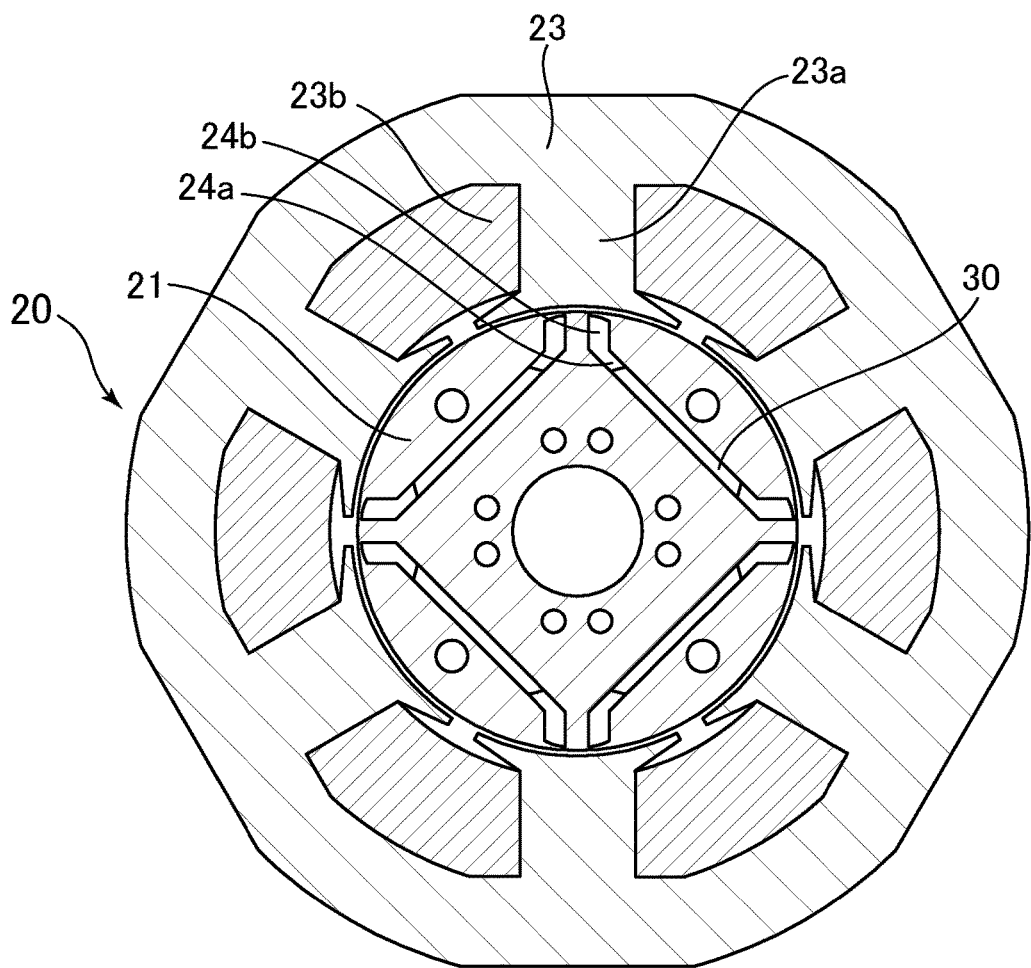
FIG. 4 is a cross-sectional view of an electric motor capable of using a permanent magnet according to the present invention.

FIG. 3 depicts a state after a rare-earth permanent magnet 30 formed by magnetizing the permanent magnet-forming sintered body 1 having the easy magnetization axes oriented in the above manner is inserted into the magnet-insertion slot 24 of the rotor core 21 depicted in FIG. 2. As depicted in FIG. 3, the rare-earth permanent magnet 30 is inserted into the linear central section 24*a* formed in the rotor core 21 in such a manner that the upper side 2 thereof faces outwardly, i.e., toward the stator 23. On an outward side with respect to each of opposite ends of the inserted permanent magnet 30, part of the linear central section 24*a* and the inclined section 24*b* of the slot are left as a void space. FIG. 4 is a cross-sectional view depicting an entirety of the electric motor 20 formed by inserting the permanent magnet into the slot 24 of the rotor core 21 in the above manner.

Figure 5:
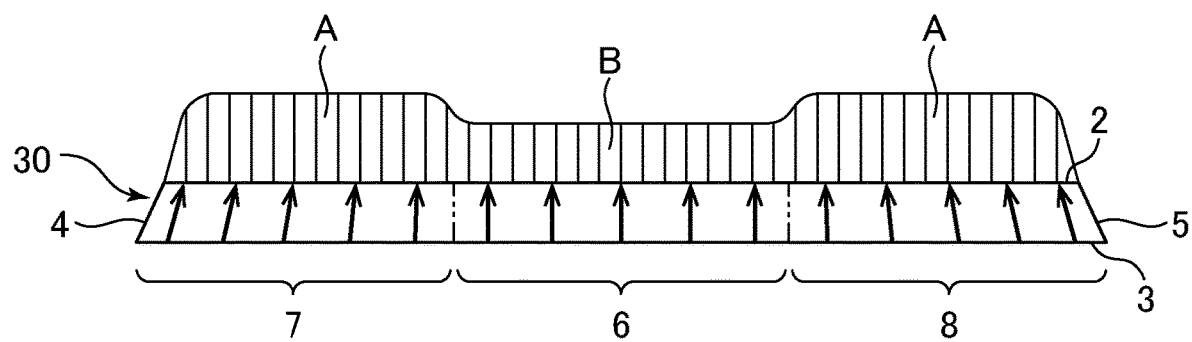
FIG. 5 is a diagram depicting a magnetic flux density distribution in a rare-earth permanent magnet formed from the sintered body according to the embodiment depicted in FIG. 1.

FIG. 5 depicts a magnetic flux density distribution in the rare-earth permanent magnet 30 formed in the above embodiment. As depicted in FIG. 5, a magnetic flux density A in each of the end regions 7, 8 of the permanent magnet 30 is greater than a magnetic flux density B in the central region 6. Thus, during operation of the electric motor 20 with this permanent magnet 30 embedded in the rotor core 21, even when a magnetic flux is applied from the stator 23 to the ends of the permanent magnet 30, demagnetization of the ends of the permanent magnet 30 is suppressed, and a sufficient magnetic flux remains in the ends of the permanent magnet 30 after the demagnetization. This prevents reduction in power output of the motor 20.

In the permanent magnet 30 mounted to the electric motor as depicted in FIG. 4, along with rotation of the electric motor 30, a magnetization value thereof varies during 360-degree rotation under influence of an external magnetic field applied to the permanent magnet 30. A magnetization value of the permanent magnet 30 in a state in which it is minimized during the 360-degree rotation will hereinafter be referred to as "minimum magnetization value". When observing a permanent magnet itself, the minimum magnetization value appears in lengthwise opposite end regions of the permanent magnet.

Figure 6A:
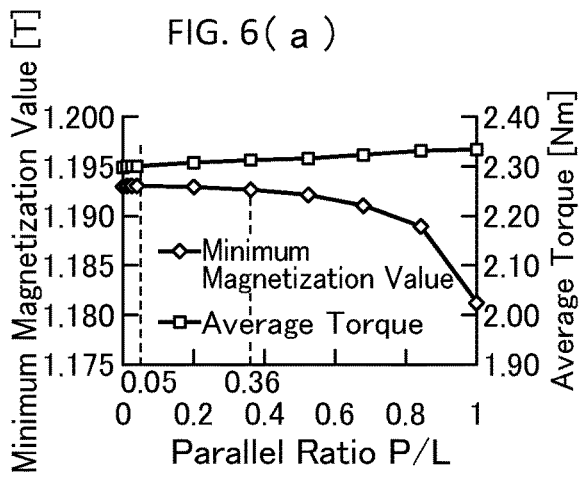
FIG. 6(a) is a graph presenting an influence of a parallel ratio on an average torque of an electric motor incorporating a rare-earth permanent magnet according to one embodiment of the present invention, and a minimum magnetization value of the permanent magnet.

Generally, when a permanent magnet-embedded electric motor is evaluated using a plurality of permanent magnets having the same magnetic quantity, as a magnet length L is increased, an average torque of the electric motor becomes larger, whereas each of the permanent magnets tends to have a lower minimum magnetization value. The inventors of the present invention examined a relationship of the parallel ratio P/L, the minimum magnetization value and the average motor torque, in the rare-earth permanent magnet having the central region 6 in which easy magnetization axes of the magnet material particles have the parallel orientation, and the end regions 7, 8 in each of which easy magnetization axes of the magnet material particles have the inclined orientation. As a result, it was found that the average motor torque increases approximately in proportion to an increase of the parallel ratio P/L, whereas the minimum magnetization value exponentially decreases along with the increase of the parallel ratio P/L. FIG. 6(a) depicts a typical example thereof, based on a permanent magnet in which the magnet length L is 25 mm and the inclination angle θ is 70°. As depicted in FIG. 6(a), as competed to when the parallel ratio P/L is 0, when the parallel ratio P/L is in a certain range greater than 0.05, the average motor torque becomes higher, and a decrease in the minimum magnetization value is small. However, when the parallel ratio P/L exceeds 0.8, the decrease in the minimum magnetization value cannot become unignorable. That is, the permanent magnet embedded in the electric motor is exposed to high temperatures during operation of the electric motor, wherein the permanent magnet has a magnetization property that as the temperature becomes higher, magnetization reversal occurs under a lower external magnetic field. Thus, if the minimum magnetization value is excessively reduced, the magnetization reversal is more likely to occur in the permanent magnet under a temperature rise arising in the electric motor. This relationship was examined using a plurality of permanent magnets in which the magnet length L was in the range of 20 mm to 26 mm. As a result, the above tendency was the same in any length. Therefore, the parallel ratio P/L is preferably set to 0.8 or less. From this viewpoint, the parallel ratio P/L is preferably set in the range of 0.05 to 0.8, and, from a viewpoint of the average motor torque, the parallel ratio P/L is more preferably set in the range of 0.2 to 0.8. Further, as the range of the parallel ratio P/L in which the average motor torque is relatively high, and the decrease in the minimum magnetization value is relatively small, it is most preferable to select the range of 0.3 to 0.4.

Figure 6B:
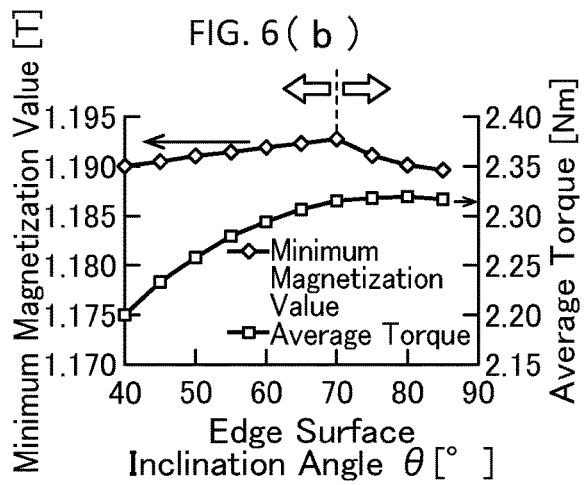
FIG. 6(b) is a graph presenting an influence of an edge surface inclination angle on an average torque of an electric motor incorporating a rare-earth permanent magnet according to one embodiment of the present invention, and a minimum magnetization value of the permanent magnet.

In addition to the above examination, the inventors also examined a relationship of the minimum magnetization value, the average motor torque and the inclination angle θ of each of the edge surfaces 4, 5 (edge surface inclination angle θ). FIG. 6(b) depicts a result of the examination on a permanent magnet in which the magnet length L is 25 mm and the length of the central region 6 is 9 mm. As seen from FIG. 6(b), as the edge surface inclination angle θ gradually increases from 40°, the minimum magnetization value proportionally increases until the inclination angle θ reaches a specific angle at which the minimum magnetization value exhibits a local maximum value. On the other hand, after the inclination angle θ exceeds the specific angle giving the local maximum value, the minimum magnetization value exponentially decreases along with an increase in the inclination angle θ. In the angle range less than the edge surface inclination angle θ at which the minimum magnetization value exhibits the local maximum value, the minimum magnetization value appears in each of the end regions 7, 8 at a position adjacent to the central region 6 and close to the second surface 3 of the permanent magnet. On the other hand, in the angle range greater than the edge surface inclination angle θ giving the local maximum value, the minimum magnetization value appears at a position close to each of the edge surfaces 4, 5.

Figure 6C:
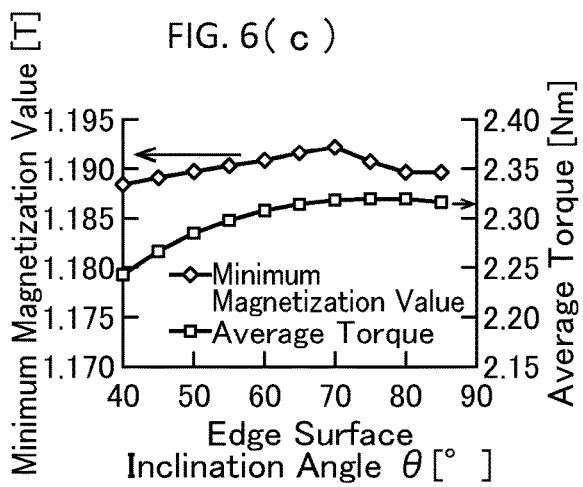
FIG. 6(c) is a graph similar to FIG. 6(b), in the case where the electric motor uses a rare-earth permanent magnet having a parallel ratio different from that in FIG. 6(b).
Figure 6D:
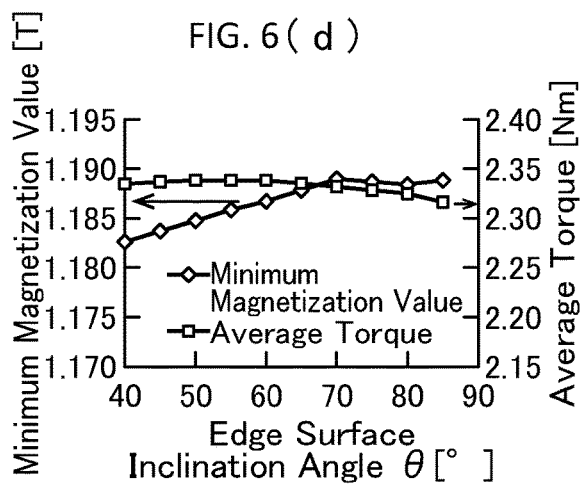
FIG. 6(d) is a graph similar to FIGS. 6(b) and 6(c), in the case where the electric motor uses a rare-earth permanent magnet having a parallel ratio different from those in FIGS. 6(b) and 6(c).

FIGS. 6(c) and 6(d) depict an influence of the edge surface inclination angle θ on the minimum magnetization value and the average motor torque, respectively, in a permanent magnet in which the magnet length is 25 mm and the length P of the central region 6 is 13 mm, and in a permanent magnet in which the magnet length is 25 mm and the length P of the central region 6 is 21 mm. Results depicted in these figures show that, when the magnet length L is 25 mm, the minimum magnetization value is maximized when the edge surface inclination angle θ is about 70°. As depicted in FIG. 6(b), in the permanent magnet in which the length of the central region 6 is 9 mm, the average motor torque quadratically changes, and locally maximized at an edge surface inclination angle θ of about 75°. Further, as depicted in FIG. 6(c), in the permanent magnet in which the length P of the central region 6 is 13 mm, the average motor torque becomes higher over the entire range, as compared to the permanent magnet in which the length of the central region 6 is 9 mm, although the tendency of change in the average motor torque is similar to that depicted in FIG. 6(b). Further, as depicted in FIG. 6(d), in the permanent magnet in which the length P of the central region 6 is 21 mm, the tendency of change in the average motor torque is different from that depicted in FIG. 6(b), i.e., the average motor torque becomes higher over the entire range, as compared to the permanent magnets in which the length of the central region 6 is 9 mm and 13 mm, although a change rate thereof along with a change in the edge surface inclination angle θ becomes smaller. This shows that, in the permanent magnet having a magnet length L of 25 mm, the edge surface inclination angle θ is preferably about 70°.

Figure 6E:
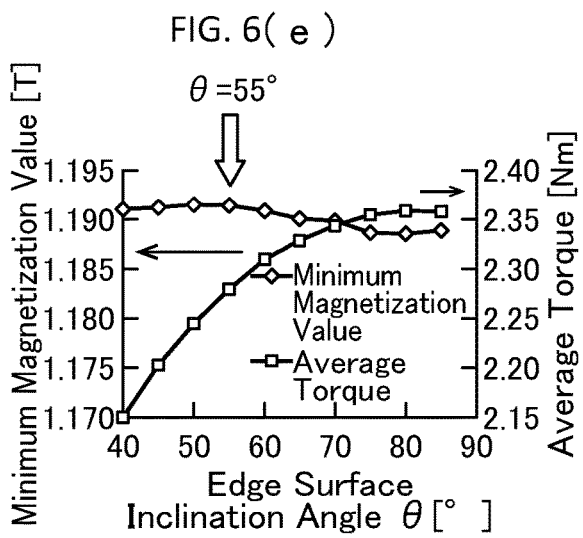
FIG. 6(e) is a graph similar to FIG. 6(b), in the case where the electric motor uses a rare-earth permanent magnet having an edge surface inclination angle and a magnet length different from those in FIG. 6(b).
Figure 6F:
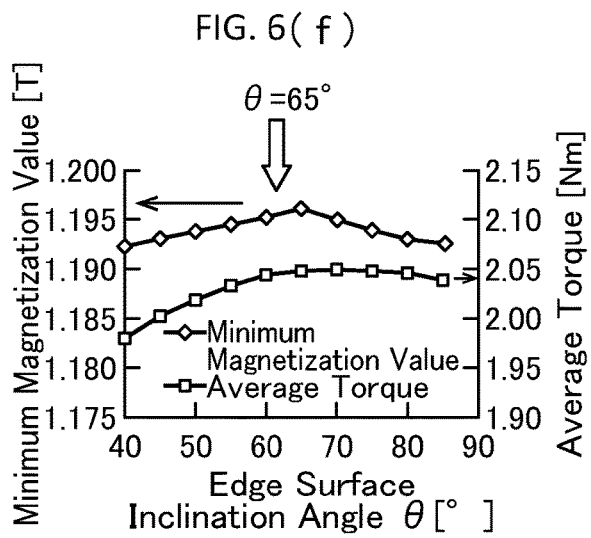
FIG. 6(f) is a graph similar to FIG. 6(e), in the case where the electric motor uses a rare-earth permanent magnet having an edge surface inclination angle and a magnet length different from those in FIG. 6(e).

FIGS. 6(e) and 6(f) are graphs presenting results of examinations on an influence of the magnet length L on the edge surface inclination angle θ and the minimum magnetization value, wherein FIG. 6(e) illustrates one example pertaining to a permanent magnet in which the magnet length L is 26 mm and the length of the central region 6 is 2 mm, and FIG. 6(f) illustrates another example pertaining to a permanent magnet in which the magnet length L is 20 mm and the length of the central region 6 is 8 mm. As depicted in FIG. 6(e), in the permanent magnet in which the magnet length L is 26 mm and the length of the central region 6 is 2 mm, the minimum magnetization value is locally maximized at an edge surface inclination angle θ of about 55°. FIG. 6(f) shows that, in the permanent magnet in which the magnet length L is 20 mm and the length P of the central region 6 is 8 mm, the minimum magnetization value is locally maximized at an edge surface inclination angle θ of about 65°. Further, the results depicted in FIGS. 6(b), 6(c) and 6(d) pertaining to the permanent magnets in which the magnet length L is 25 mm show that the minimum magnetization value is locally maximized at an edge surface inclination angle θ of about 70°. Thus, the edge surface inclination angle θ at which the minimum magnetization value is locally maximized can be considered to be in the range of 55° to 70°. On an assumption that a range of ±10° with respect to the edge surface inclination angle θ at which the minimum magnetization value is locally maximized is defined as an effective range, a lower limit and an upper limit of the edge surface inclination angle θ are set based on the above results. In this case, the range of the edge surface inclination angle θ can be considered to be preferably from 45° to 80°. Further, when taking into account the average motor torque in the result depicted in FIG. 6(e), the edge surface inclination angle θ can be considered to be more preferably in the ranger of 55° to 80°.

[Production Method for Rare-Earth Permanent Magnet-Forming Sintered Body]

Figure 7:
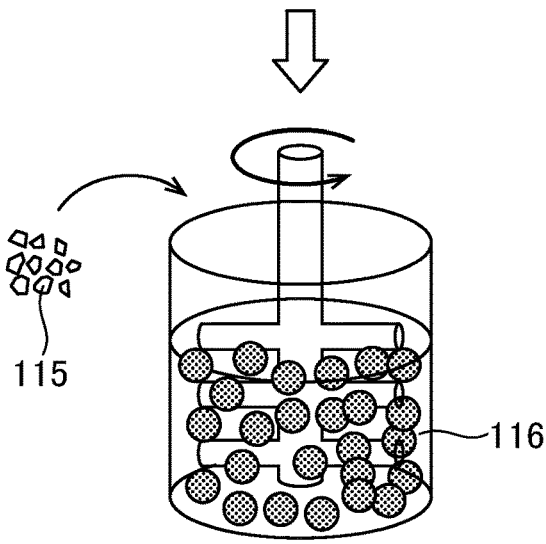
Figure 7:
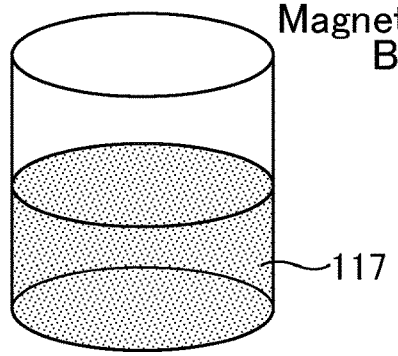
Figure 7:
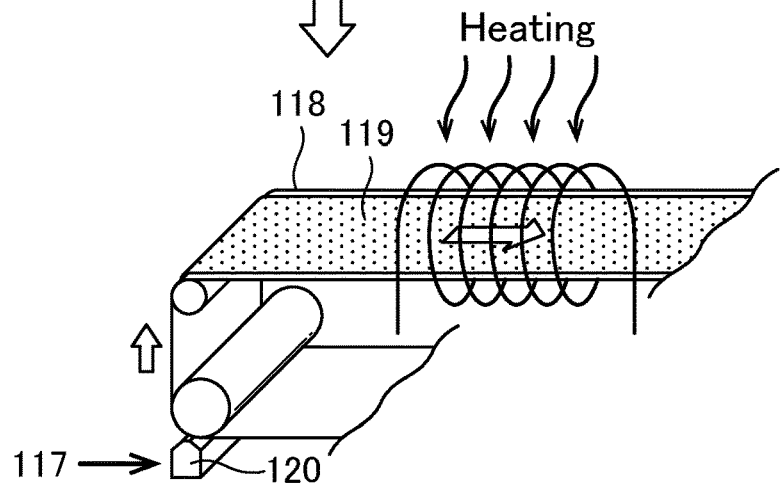

Next, with reference to FIG. 7, a production method for the rare-earth permanent magnet-forming sintered body 1 according to the embodiment depicted in FIG. 1 will be described. FIG. 7 is a schematic diagram depicting a production process of the permanent magnet-forming sintered body 1 according to this embodiment.

First of all, an ingot of a magnet material comprised of an Nd—Fe—B based alloy having a given mixing ratio is produced by a casting process. Typically, the Nd—Fe—B based alloy usable for a neodymium magnet has a composition comprising 30 wt % of Nd, 67 wt % of Fe which is preferably electrolytic iron, and 1.0 wt % of B. Subsequently, this ingot is coarsely pulverized to a size of about 200 μm, using heretofore-known means such as a stamp mill or a crusher. Alternatively, the ingot may be melted and subjected to a strip casting process to produce flakes, and then the flakes may be coarsely powdered by a hydrogen cracking process. In this way, coarsely-pulverized magnet material particles 115 are obtained (see FIG. 7(a)).

Subsequently, the coarsely-pulverized magnet material particles 115 are finely pulverized by a wet process using a bead mill 116, a dry process using a jet mill, or the like. For example, in the fine pulverization based on a wet process using a bead mill 116, the coarsely-pulverized magnet material particles 115 are finely pulverized, in the solvent, to a particle size falling within a given range (e.g., 0.1 μm to 5.0 μm), to thereby disperse the resulting magnet material particles in the solvent (see FIG. 7(b)). Subsequently, the magnet material particles contained in the solvent after the wet pulverization are dried by drying mean such as vacuum drying, and the dried magnet material particles are extracted (not depicted). A type of solvent usable in the pulverization is not particularly limited. For example, it is possible to use an organic solvent including: alcohols such as isopropyl alcohol, ethanol and methanol; esters such as ethyl acetate; lower hydrocarbons such as pentane and hexane; aromatics such as benzene, toluene and xylene; and ketones; and mixtures thereof, and an inorganic solvent including liquefied argon. In any case, it is preferable to use a solvent containing no oxygen atom therein.

On the other hand, in the fine pulverization based on a dry process using a jet mill, the coarsely-pulverized magnet material particles 115 are finely pulverized by the jet mill, in (a) an atmosphere consisting inert gas such as nitrogen gas, Ar gas or He gas, wherein an oxygen content of the inert gas is substantially 0%, or (b) an atmosphere consisting inert gas such as nitrogen gas, Ar gas or He gas, wherein an oxygen content of the inert gas is in the range of 0.001 to 0.5%, and formed as fine particles having an average particle size falling within a given range, such as 0.7 μm to 5.0 μm. As used herein, the term "the concentration of oxygen is substantially 0%" does not limitedly mean that the concentration of oxygen is absolutely 0%, but means that oxygen may be contained in an amount to an extent that it very slightly forms an oxide layer on surfaces of the fine particles.

Subsequently, the magnet material particles finely pulverized by the bead mill 116 or the like are formed into a desired shape. For shaping of the magnet material particles, a mixture obtained by mixing the finely-pulverized magnet material particles 115 and a binder together is preliminarily prepared. As the binder, it is preferable to use a resin material. In the case where a resin is used as the binder, it is preferable to use a polymer containing no oxygen atom in its structure and having a depolymerization property. Further, it is preferable to use a thermoplastic resin so as to enable a residue of the mixture of the magnet material particles and the binder, occurring when the mixture is formed into a desired shape such as a trapezoidal shape in cross-section, as described later, to be reused, and enable magnetic field orientation to be performed under a condition that the binder is softened as a result of heating the mixture. More specifically, a polymer is suitably used which comprises one or more polymers or copolymers formed from a monomer represented by the following general formula (1):

(1)

(where each of R1 and R2 denotes one of a hydrogen atom, a lower alkyl group, a phenyl group and a vinyl group.)

Examples of a polymer meeting the above conditions include: polyisobutylene (PIB) as a polymer of isobutylene; polyisoprene (isoprene rubber (IR)) as a polymer of isoprene; polybutadiene (butadiene rubber (BR)) as a polymer of 1,3-butadiene; polystyrene as a polymer of styrene; a styrene-isoprene-styrene block copolymer (SIS) as a copolymer of styrene and isoprene; butyl rubber (IIR) as a copolymer of isobutylene and isoprene; a styrene-butadiene-styrene block copolymer (SBS) as a copolymer of styrene and butadiene; a styrene-ethylene-butadiene-styrene copolymer (SEBS) as a copolymer of styrene, ethylene and butadiene; a styrene-ethylene-propylene-styrene copolymer (SEPS) as a copolymer of styrene, ethylene and propylene; an ethylene-propylene copolymer (EPM) as a copolymer of ethylene and propylene; EPDM obtained by copolymerizing diene monomers together with ethylene and propylene; polyethylene as a polymer of ethylene; polypropylene as a polymer of propylene; a 2-methyl-1-pentene polymerized resin as a polymer of 2-methyl-1-pentene; a 2-methyl-1-butene polymerized resin as a polymer of 2-methyl-1- butene; and an α-methylstyrene polymerized resin as a polymer of α-methylstyrene. A resin to be used as the binder may have a composition containing a polymer or copolymer of monomers containing an oxygen atom and/or a nitrogen atom (e.g., poly(butyl methacrylate) or poly(methyl methacrylate)) in a small amount. Further, a monomer which does not meet the general formula (1) may be partially copolymerized. Even in such a situation, it is possible to achieve the object of the present invention.

As a resin to be used as the binder, it is desirable, from a viewpoint of adequately performing magnetic field orientation, to use a thermoplastic resin capable of being softened at a temperature of 250° C. or less (i.e., having a softening temperature of 250° C. or less), more specifically a thermoplastic resin having a glass-transition temperature or flow starting temperature of 250° C. or less.

In order to disperse the magnet material particles over the thermoplastic resin, it is desirable to add a dispersant in an appropriate amount. As the dispersant, it is desirable to add at least one selected from the group consisting of alcohol, carboxylic acid, ketone, ether, ester, amine, imine, imide, amide, cyanogen, phosphorous functional group, sulfonic acid, a compound having an unsaturated bond such as a double bond or a triple bond, and a liquid, saturated hydrocarbon compound. Two or more of them may be used in the form of a mixture. Further, in advance of aftermentioned operation of applying a magnetic field to the mixture of the magnet material particles and the binder to thereby magnetically orient the magnet material particles, the mixture is heated to allow such magnetic field orientation treatment to be performed under a condition that the binder component is softened.

By using a binder satisfying the above conditions to serve as the binder to be mixed with the magnet material particles, it is possible to reduce an amount of carbon and an amount of oxygen remaining in a rare-earth permanent magnet-forming sintered body after sintering. Specifically, an amount of carbon remaining in a rare-earth permanent magnet-forming sintered body after sintering can be reduced to 2000 ppm or less, more preferably 1000 ppm or less. Further, an amount of oxygen remaining in a rare-earth permanent magnet-forming sintered body after sintering can be reduced to 5000 ppm or less, more preferably 2000 ppm or less.

An addition amount of the binder is set to a value capable of, when shaping a slurry-form or heated and melted compound, filling gaps among the magnet material particles so as to provide improved thickness accuracy to a shaped body obtained as a result of the shaping. For example, a ratio of the binder to a total amount of the magnet material particles and the binder is set in the range of 1 wt % to 40 wt %, more preferably in the range of 2 wt % to 30 wt %, still more preferably in the range of 3 wt % to 20 wt %.

In the following example, the mixture is formed into a shape other than that of an intended product once, and a magnetic field is applied to the resulting shaped body to orient easy magnetization axes of the magnet material particles, whereafter the resulting shaped body is subjected to shaping and sintering to obtain a product having a desired shape such as a trapezoidal shape in cross-section as depicted in FIG. 1. Particularly, in the following example, the mixture comprising the magnet material particles and the binder, i.e., a compound 117, is formed into a sheet-like green (unprocessed or untreated) shaped body (hereinafter referred to as "green sheet") once, and then further formed into a shape for the orientation treatment. For forming the mixture, particularly, into a sheet shape, it is possible to employ a forming method using, for example, a hot-melt coating process which comprises heating the compound 117, i.e., the mixture of the magnet material particles and the binder, and then coating the resulting melt onto a substrate to thereby form the melt into a sheet shape, or a slurry coating process which comprises coating a slurry containing the magnet material particles, the binder and an organic solvent, on a substrate, to thereby form the slurry into a sheet shape.

Although the following description will be made about formation of the green sheet using, particularly, the hot-melt coating process, the forming method in the present invention is not limited to such a specific coating process.

A binder is mixed with the magnet material particles finely pulverized using the bead mill 116 or the like, to prepare a clayey mixture comprising the magnet material particles and the binder, i.e., a compound 117, as mentioned above. In this process, it is possible to use, as the binder, a mixture of a resin and a dispersant as mentioned above. As one example of the binder, it is preferable to use a thermoplastic resin comprising a polymer containing no oxygen atom in its structure and having a depolymerization property. Further, as the dispersant, it is preferable to add at least one selected from the group consisting of alcohol, carboxylic acid, ketone, ether, ester, amine, imine, imide, amide, cyanogen, phosphorous functional group, sulfonic acid, and a compound having an unsaturated bond such as a double bond or a triple bond. As to an addition amount of the binder, in the compound 117 after addition of the binder, a ratio of the binder to a total amount of the magnet material particles and the binder is set in the range of 1 wt % to 40 wt %, more preferably in the range of 2 wt % to 30 wt %, still more preferably in the range of 3 wt % to 20 wt %, as mentioned above.

Further, an addition amount of the dispersant is preferably determined depending on a particle size of the magnet material particles, wherein it is recommended to increase the addition amount as the particle size of the magnet material particles becomes smaller. Specifically, the addition amount may be set in the range of 0.1 parts to 10 parts, preferably in the range of 0.3 parts to 8 parts, with respect to 100 parts of the magnet material particles. If the addition amount is excessively small, a dispersion effect becomes poor, possibly leading to deterioration in orientation property. On the other hand, if the addition amount is excessively large, the dispersant is likely to contaminate the magnet material particles. The dispersant added to the magnet material particles adheres onto surfaces of the magnet material particles, and acts to facilitate dispersion of the magnet material particles to provide the clayey mixture, and to assist turning of the magnet material particles in the aftermentioned magnetic field orientation treatment. As a result, it becomes possible to facilitate orientation during application of a magnetic field so as to uniform respective directions of easy magnetization axes of the magnet material particles, into approximately the same direction, i.e., so as to increase the degree of orientation. Particularly, in the case where the binder is mixed with the magnet material particles, the binder is present around the surfaces of the magnet material particles, so that a frictional force against the magnet material particles during the magnetic field orientation treatment is increased, thereby possibly leading to deterioration in orientation property of the magnet material particles. Thus, the effect arising from addition of the dispersant becomes more important.

Preferably, the mixing of the magnet material particles and the binder is performed in an atmosphere consisting of inert gas such as nitrogen gas, Ar gas or He gas. As one example, the mixing of the magnet material particles and the binder is performed by inputting the magnet material particles and the binder into a stirring machine and stirring them using the stirring machine. In this case, with a view to enhancing kneading performance, heating-stirring (stirring under heating) may be performed. It is also desirable to perform the mixing of the magnet material particles and the binder, in an atmosphere consisting of inert gas such as nitrogen gas, Ar gas or He gas. Particularly, in the case where the coarsely-pulverized magnet material particles are finely pulverized by a wet process, the compound 117 may be obtained by adding the binder to a solvent used for pulverization, without extracting the magnet material particles from the solvent, and, after kneading the resulting mixture, volatilizing the solvent.

Subsequently, the compound 117 is formed into a sheet shape to prepare the aforementioned green sheet. Specifically, in case of employing the hot-melt coating process, the compound 117 is heated and melted to have flowability, and then coated on a support substrate 118. Subsequently, the compound 117 is solidified according to heat dissipation to form a long strip-shaped green sheet 119 on the support substrate 118. In this case, although a temperature during heating and melting of the compound 117 varies depending on a type and an amount of a binder used, it is typically set in the range of 50 to 300° C. In this case, it is to be understood that the temperature needs to be set to a value greater than the flow starting temperature of the binder used. On the other hand, in case of employing the slurry coating process, a slurry obtained by dispersing the magnet material particles, the binder and optionally an additive for facilitating the orientation, over a large volume of solvent is coated on the support substrate 118. Subsequently, the slurry is subjected to drying to volatilize the solvent therefrom to thereby form a long strip-shaped green sheet 119 on the support substrate 118.

As a coating system for the melted compound 117, it is preferable to use a system having excellent layer thickness controllability, such as a slot-die system or a calender roll system. Particularly, in order to realize high thickness accuracy, it is desirable to use a die system or a comma coating system which is a system having particularly excellent layer thickness controllability, i.e., a system capable of coating a layer having a highly-accurate thickness, on a surface of a substrate. For example, in the slot-die system, the compound 117 after being heated to have flowability is pressure-fed from a gear pump into a die, and discharged from the die to perform coating. On the other hand, in the calender roll system, the compound 117 is fed into a nip gap between two heated rolls, in a controlled amount, and the rolls are rotated to coat the compound 117 melted by heat of the rolls, onto the support substrate 118. As one example of the support substrate 118, it is preferable to use a silicone-treated polyester film. Further, it is preferable to use a defoaming agent or perform a vacuum heating defoaming process to sufficiently defoam a layer of the coated and developed compound 117 so as to prevent gas bubbles from remaining in the layer. Alternatively, the melted compound 117 may be extruded onto the support substrate 118 while being formed into a sheet shape, by an extrusion forming or injection forming, instead of being coated on the support substrate 118, to thereby form the green sheet 119 on the support substrate 118.

In the example depicted in FIG. 7, coating of the compound 117 is performed using a slot-die 120. In a step of forming the green sheet 119 using this slot-die system, it is desirable to actually measure a sheet thickness of the coated green sheet 119, and adjust a nip gap between the slot-die 120 and the support substrate 118, by feedback control based on the actually-measured value. In this case, it is desirable to reduce a variation in an amount of the flowable compound 117 to be fed to the slot-die 120, as small as possible, e.g., to ±0.1% or less, and further reduce a variation in coating speed as small as possible, e.g., to ±0.1% or less. This control makes it possible to improve the thickness accuracy of the green sheet 119. As one example, with respect to a design value of 1 mm, the thickness accuracy of the green sheet 119 may be within ±10%, preferably within ±3%, more preferably within ±1%. In the calender roll system, a film thickness of the compound 117 to be transferred to the support substrate 118 can be controlled by feedback-controlling calendering conditions based on an actually-measured value in the same manner as that described above.

Preferably, the thickness of the green sheet 119 is set in the range of 0.05 mm to 20 mm. If the thickness is reduced to less than 0.05 mm, it becomes necessary to laminate a plurality of layers so as to achieve a required magnet thickness, resulting in deteriorated productivity.

Subsequently, the green sheet 119 formed on the support substrate 118 by the hot-melt coating process is cut into a size corresponding to a desired magnet size to form a processing sheet piece 123. In this example, as depicted in FIG. 8(a), the processing sheet piece 123 is formed in a cross-sectional shape having: a linear region 6a having a lengthwise length, corresponding to the central region 6 in the rare-earth permanent magnet-forming sintered body 1 as a final product, and two arc-shaped regions 7a, 8a continuous, respectively, with opposite ends of the linear region 6a. This processing sheet piece 123 has a width dimension in a direction orthogonal to the drawing sheet surface, and dimensions of this cross-section and a width dimension are set in consideration of a dimensional shrinkage during an aftermentioned sintering step, i.e., to enable the desired magnet size to be obtained after the aftermentioned sintering step.

A parallel magnetic field 121 is applied to the processing sheet piece 123 depicted in FIG. 8(a), in a direction orthogonal to surfaces of the linear region 6a. Through this magnetic field application, easy magnetization axes of the magnet material particles included in the processing sheet piece 123 are oriented in the direction of the magnetic field, i.e., in a direction parallel to a thickness direction of the processing sheet piece 123, as depicted by the arrowed lines 122 in FIG. 8(a). Specifically, the processing sheet piece 123 is placed in a magnetic field application mold (not depicted) having a cavity with a shape corresponding to that of the processing sheet piece 123, and heated to soften the binder contained in the processing sheet piece 123. More specifically, the processing sheet piece 123 is heated until the viscosity of the binder contained in the processing sheet piece 123 becomes 1 to 1500 Pa·s, preferably 1 to 500 Pa·s, to thereby soften the binder. This enables the magnet material particles to be turned within the binder, i.e., enables the easy magnetization axes of the magnet material particles to be oriented in directions along the parallel magnetic field 121.

Figure 8:
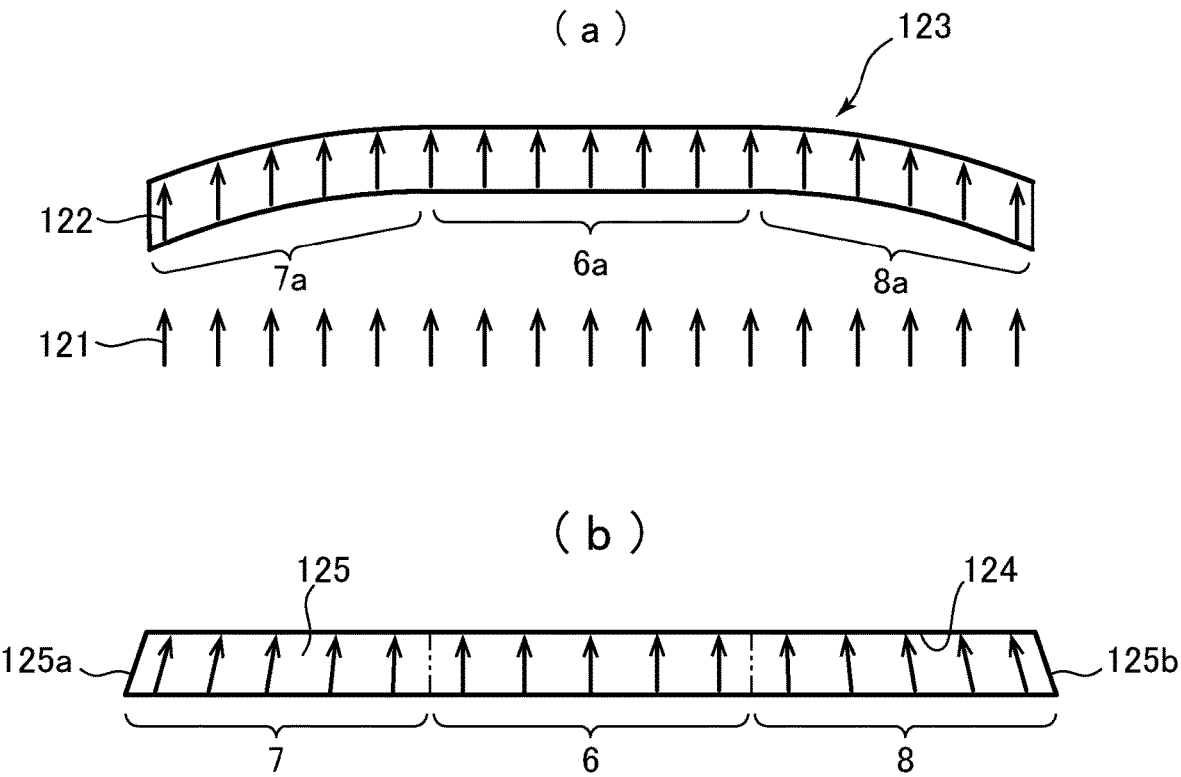

In this process, although a temperature and a time for heating the processing sheet piece 123 vary depending on a type and an amount of a binder used, they may be set, respectively, to 40 to 250° C. and 1 to 60 minutes, for example. In either case, for softening the binder contained in the processing sheet piece 123, the heating temperature needs to be set to a value equal to or greater than a glass-transition temperature or flow starting temperature of the binder used. Examples of a means to heat the processing sheet piece 123 include a heating system using a hot plate, and a system using, as a heat source, a heating medium such as silicone oil. A magnetic field intensity during the magnetic field application may be set in the range of 5000 [Oe] to 150000 [Oe], preferably in the range of 10000 [Oe] to 120000 [Oe]. As a result, the easy magnetization axes of the magnet material particles included in the processing sheet piece 123 are oriented in parallel alignment in directions along the parallel magnetic field 121, as depicted in FIG. 8(*a*). This magnetic field application step may be configured such that a magnetic field is simultaneously applied to a plurality of the processing sheet pieces 123. In this case, the parallel magnetic field 121 may be simultaneously applied, using a mold having a plurality of cavities or a plurality of molds arranged side-by-side. The step of applying a magnetic field to the processing sheet piece 123 may be performed in concurrence with the heating step, or during a period after completion of the heating step and before solidification of the binder of the processing sheet piece 123.

Subsequently, the processing sheet piece 123 in which the easy magnetization axes of the magnet material particles thereof are oriented in parallel alignment as indicated by the arrowed line 122 through the magnetic field application step depicted in FIG. 8(*a*) is extracted from the magnetic field application mold, and transferred into a final shaping mold having a trapezoidal-shaped cavity 124 having an elongate lengthwise dimension depicted in FIG. 8(*b*), so as to be shaped into a sintering sheet piece 125. Through this shaping, the processing sheet piece 123 is shaped such that the arc-shaped regions 7*a*, 8*a* are deformed into a shape linearly continuous with the central linear region 6*a*, while being formed with inclined surfaces 125*a*, 125*b* at respective edges thereof. In the sintering sheet piece 125 formed through the shaping step, easy magnetization axes of magnet material particles included in the central linear region 6*a* maintained in a state in which they are oriented parallel to the thickness direction. On the other hand, in each of the end regions 7*a*, 8*a*, as a result of deforming the upwardly convexed shape into a linear shape continuous with the central linear region, easy magnetization axes therein are oriented so as to be converged toward part of an upper side corresponding to each of the end regions, as depicted in FIG. 8(*b*).

The post-orientation sintering sheet piece 125 in which the easy magnetization axes of the magnet material particles thereof are oriented in the above manner is subjected to calcining treatment in a non-oxidizing atmosphere adjusted at atmospheric pressure, or a pressure greater or less than atmospheric pressure (e.g., at 1.0 Pa or 1.0 MPa) at a decomposition temperature of the binder for a holding time of several hours to several ten hours (e.g., 5 hours). In this treatment, it is recommended to use a hydrogen atmosphere or a mixed gas atmosphere of hydrogen and inert gas. In the case where the calcining treatment is performed in a hydrogen atmosphere, a supply amount of hydrogen during the calcining treatment is set, for example, to 5 L/min. The calcining treatment makes it possible to remove organic compounds contained in the binder by decomposing the organic compounds to monomers by a depolymerization reaction or other reactions, and releasing the monomers. That is, decarbonizing which is treatment for reducing an amount of carbon remaining in the sintering sheet piece 125 is performed. Further, it is preferable to perform the calcining treatment under conditions which enable the amount of carbon remaining in the sintering sheet piece 125 to become 2000 ppm or less, preferably 1000 ppm or less. This makes it possible to densely sinter the entire sintering sheet piece 125 through subsequent sintering treatment to thereby suppress lowering of residual magnetic flux density and coercive force. In the case where a pressurization condition during the calcining treatment is set to a pressure greater than atmospheric temperature, it is desirable to set the pressure to 15 MPa or less. Further, the pressurization condition may be set to a pressure greater than atmospheric temperature, more specifically, to 0.2 MPa or more. In this case, an effect of reducing an amount of residual carbon can be particularly expected.

The binder decomposition temperature may be set based on a result of analysis of binder decomposition products and decomposition residues. Specifically, it is recommended to select a temperature range in which, when binder decomposition products are collected, no decomposition product other than monomers is observed, and, in analysis of residues, no product resulting from a side reaction of a residual binder component is detected. Although the binder decomposition temperature varies depending on a type of a binder, it may be set in the range of 200° C. to 900° C., preferably in the range of 40° C. to 600° C., e.g., to 450° C.

Figure 9:
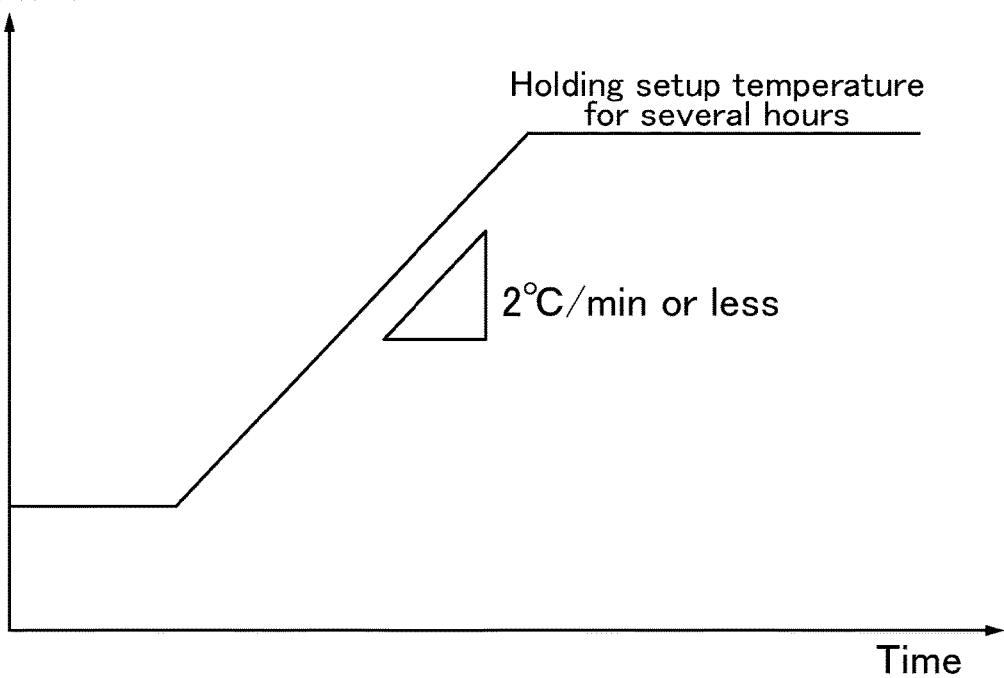
FIG. 9 is a graph presenting a desirable temperature rising speed in calcining treatment.

In the above calcining treatment, it is preferable to set a temperature rising speed to a smaller value, as compared to typical sintering treatment of a rare-earth magnet. Specifically, the temperature rising speed may be set to 2° C./min or less, e.g., 1.5° C./min. In this case, a good result can be obtained. Thus, the calcining treatment is performed such that a calcining temperature is increased at a given temperature rising speed of 2° C./min or less as depicted in FIG. 9, and, after reaching a predetermined setup temperature (binder decomposition temperature), held at the setup temperature for several hours to several ten hours. As above, the temperature rising speed in the calcining treatment is set to a relatively small value, so that carbon in the entire sintering sheet piece 125 is removed in a step-by-step manner without being rapidly removed. This makes it possible to reduce an amount of residual carbon to a sufficient level to thereby increase the density of a permanent magnet-forming sintered body after sintering. That is, by reducing the amount of residual carbon, it is possible to reduce voids in a permanent magnet. When the temperature rising speed is set to about 2° C./min as mentioned above, the density of a permanent magnet-forming sintered body after sintering can be increased to 98% or more (7.40 g/cm$^3$ or more), and high magnet properties can expected in a magnet after magnetization.

Subsequently, treatment for sintering the sintering sheet piece 125 calcined by the calcining treatment is performed. In this example, as the sintering treatment, it is preferable to employ a uniaxial pressing-sintering method which comprises sintering the sintering sheet piece 125 while uniaxially pressing the sintering sheet piece 125 in a direction orthogonal to the drawing sheet surface, although an in-vacuum non-pressurized sintering method may be employed. In this method, the sintering sheet piece 125 is loaded in a sintering mold (not depicted) having a cavity with the same shape as that designated by the reference sign "124" in FIG. 8(*b*). Then, after closing the mold, the sintering sheet piece 125 is sintered while being pressed in the direction orthogonal to the drawing sheet surface. More specifically, a uniaxial pressing-sintering method is employed which comprises sintering the sintering sheet piece 125 while being pressed in the direction orthogonal to the drawing sheet surface, i.e., in the same direction as an axial direction of the rotor core 21 along which a rare-earth permanent magnet formed from the sintering sheet piece 125 is received in the magnet-insertion slot 24 depicted in FIG. 2. As this pressing-sintering technique, it is possible to employ any heretofore-known techniques such as hot press sintering, hot isostatic press (HIP) sintering, ultrahigh pressure synthesis sintering, gas pressure sintering, and spark plasma sintering (SPS). In particular, it is preferable to employ the SPS in which a pressure can be applied in a uniaxial direction, and sintering is performed by electric current sintering. In the case where the sintering is performed by the SPS, it is preferable to perform the sintering, for example, at a pressing pressure of 0.01 MPa to 100 MPa, in a vacuum atmosphere at a pressure of several Pa or less, wherein a treatment temperature is increased up to 900° C. to 1000° C., e.g., 940° C., at a temperature rising speed of 3° C./min to 30° C./min, e.g., 10° C./min, and then held until a rate of increase in the dimensional decrease per 10 sec becomes 0. This holding time is typically about 5 minutes. Subsequently, after cooling the sheet piece, a heat treatment is performed again in which the sheet piece is heated to 300° C. to 1000° C., and held at the temperature for 2 hours. As a result of the above sintering treatment, the rare-earth permanent magnet-forming sintered body 1 according to the present invention is produced from the sintering sheet piece 125. As above, the uniaxial pressing-sintering method capable of sintering the sintering sheet piece 125 while pressing it in the direction orthogonal to the drawing sheet surface makes it possible to eliminate a risk of a change in orientations of the easy magnetization axes imparted to the magnet material particles in the sintering sheet piece 125.

This rare-earth permanent magnet-forming sintered body 1 is inserted into the magnet-insertion slot 24 of the rotor core 21 depicted in FIG. 2, in an unmagnetized state. Then, the rare-earth permanent magnet-forming sintered body 1 inserted into the magnet-insertion slot 24 is subjected to magnetization along the easy magnetization axis, i.e., C axes, of the magnet material particles included therein. Specifically, the magnetization is performed such that an N-pole and an S-pole are alternately arranged along a circumferential direction of the rotor core 21, with respect to a plurality of the rare-earth permanent magnet-forming sintered bodies 1 each inserted into a respective one of a plurality of the slots 24 of the rotor core 21. As a result, the permanent magnet 1 can be produced. For magnetization of the rare-earth permanent magnet-forming sintered body 1, it is possible to use any theretofore-known magnetization means, such as a magnetizing coil, a magnetizing yoke, or a capacitor-type magnetizing power supply device. Alternatively, the rare-earth permanent magnet-forming sintered body 1 may be magnetized to form a rare-earth permanent magnet before being inserted into the slot 24, and then this magnetized magnet may be inserted into the slot 24.

Subsequently, motor components such as a stator (not depicted) and a rotary shaft (not depicted) are assembled to the resulting rotor to produce a desired electric motor such as an IPM (Interior Permanent Magnet) motor.

As described above in detail, in the production method for the rare-earth permanent magnet-forming sintered body 1 according to this embodiment, a magnet material is pulverized into fine particles of the magnet material, and the pulverized magnet material particles and a binder are mixed together to create a compound 117. Then, the created compound 117 is formed into a sheet shape to prepare a green sheet 119. Subsequently, the shaped green sheet 119 is cut into a sheet piece having a given size and the sheet piece is formed into a desired shape to form a processing sheet piece 123. Then, a parallel magnetic field is applied to the processing sheet piece 123 in a thickness direction thereof to thereby orient easy magnetization axes of the magnet material particles therein. Then, the processing sheet piece 123 after being subjected to the orientation treatment is deformed into a given shape, i.e., formed into a product shape, to obtain a sintering sheet piece 125. Subsequently, the sintering sheet piece 125 is sintered in a non-pressing state, or a uniaxially pressing state in a direction perpendicular to the drawing sheet surface, to produce the rare-earth permanent magnet-forming sintered body 1. In a rare-earth permanent magnet produced by magnetizing the rare-earth permanent magnet-forming sintered body 1 obtained in the above manner, easy magnetization axes of the magnet material particles are converged such that a density of the magnet material particles whose easy magnetization axes are directed toward a surface of the permanent magnet becomes greater in each end region than in a central region of the permanent magnet. Thus, in the end region which is more likely to be demagnetized as compared to the central region, a magnetic flux density can be increased to be higher than that in the central region, so that it becomes possible to keep up a necessary and sufficient surface magnetic field density even when an external magnetic field exerting a demagnetization action is applied to the permanent magnet. As a result, it becomes possible to prevent lowering of torque or power generation amount of a rotary electric machine along with the usage of the rotary electric machine. The capability of enhancing a demagnetization resistant property means that it is possible to reduce a magnet volume while keeping up a required demagnetization resistant property. Thus, it becomes possible to realize a reduction in size of the permanent magnet and a reduction in production cost. For example, by reducing the magnet volume to a lower limit of a specific range in which the required demagnetization resistant property can be ensured, it is possible optimally maintain a balance between the performance and the production cost of the permanent magnet.

The easy magnetization axes are oriented so as to be converged toward the surface of only the end regions requiring demagnetization measures, instead of the entire permanent magnet. Thus, it becomes possible to increase the magnetic flux density in the end regions, while solving a negative effect arising from convergence of the easy magnetization axes, such as occurrence of lowering in magnetic flux density in an area away from the anti-demagnetization region. Further, in a region other than the end regions in each of which the easy magnetization axes are oriented so as to be converged toward the surface of the end region, the easy magnetization axes are oriented in radial directions or parallel directions. Thus, it becomes possible to realize adequate orientations depending on a type of a rotary electric machine using the permanent magnet.

In the method described in connection with the above embodiment, by shaping the compound, i.e., a mixture obtained by mixing magnet material particles and a binder together, easy magnetization axes can be oriented so as to be adequately converged toward the surface of each of the end regions requiring demagnetization measures. Thus, after magnetization, it becomes possible to adequate concentrate a magnetic field to prevent variation in magnetic flux density while ensuring the demagnetization resistant property. Further, the mixture with a binder is subjected to shaping, so that, as compared to a method using a powder compact, it becomes possible to improve a degree of orientation without turning of the magnet material particles after the orientation treatment. In the technique of performing orientation by applying a magnetic field to the mixture of the magnet material particles and a binder, the number of turns of a winding wire through which a current is passed to form the magnetic field can be appropriately increased, so that it is possible to ensure a magnetic field intensity in a wide range during the magnetic field orientation, and apply a magnetic field for a long period of time in a magnetostatic field. This makes it possible to realize a high degree of orientation with little variation. Further, after the orientation treatment, resulting orientation directions may be corrected. This makes it possible to ensure a highly oriented state with little variation The capability of realizing a high degree of orientation with little variation leads to a reduction in variation due to shrinkage caused by sintering. This makes it possible to ensure uniformity of product shape after sintering. As a result, it can be expected to enable the burden of outer shape processing after sintering to be reduced, thereby largely improving stability in mass production. Further, in the step of performing magnetic field orientation, a magnetic field is applied to the mixture of the magnet material particles and a binder, and the mixture applied with the magnetic field is deformed into a shaped body to thereby manipulate directions of easy magnetization axes. Thus, it becomes possible to correct orientation directions by deforming the mixture which has been magnetic field-oriented once, to thereby enable easy magnetization axes to be oriented so as to be adequately converged in an anti-demagnetization area. As a result, it becomes possible to achieve a highly oriented state with little variation. After forming the mixture into a processing sheet piece and applying a magnetic field to the processing sheet piece, the resulting processing sheet piece is deformed to obtain a sintering sheet piece. Thus, orientation directions can be corrected in conjunction with the deformation step, so that it becomes possible to perform both of the step of forming a shape of a permanent magnet and the step of correcting the orientations by a single step, thereby improving productivity. Further, as mentioned above, in a rotary electric machine provided with a permanent magnet formed by magnetizing the sintered body 1, it becomes possible to prevent a problem of lowering in torque or power generation amount, even when an external magnetic field exerting a demagnetization action is applied to the end regions of the permanent magnet 1. For example, in the above embodiment, although the rare-earth permanent magnet-forming sintered body 1 is formed in a trapezoidal shape in cross-section, it may be formed in another shape such as an arch shape or a semi-cylindrical shape, depending on intended purpose. Further, a shape of a magnetic field distribution to be realized may be appropriately modified depending on a shape and intended purpose of the permanent magnet.

It is to be understood that the present invention can also be applied to a rotary electric machine in which a permanent magnet is disposed in an insertion section formed in a stator, instead of a rotor. Further, the present invention can be applied to not only the aforementioned inner rotor-type rotary electric machine but an outer rotor-type rotary electric machine. The permanent magnet according to the present invention can also be applied to a linear motor in which a surface magnet-type rotary electric machine and a permanent magnet are arranged in a plane. Further, in addition to an electric motor, the permanent magnet according to the present invention can also be applied to various other rotary electric machines such as a power generator and a magnetic speed reducer, and various devices using a permanent magnet, other than a rotary electric machine.

EXAMPLES

Example 1

A rare-earth permanent magnet having a shape depicted in FIG. 1 was produced in the following manner.

<Coarse Pulverization>

At room temperature, hydrogen was adsorbed to an alloy obtained by a strip casting process and having an alloy composition A (Nd: 23.00 wt %, Pr: 6.75 wt %, B: 1.00 wt %, Ga: 0.10 wt %, Nb: 0.2 wt %, Co: 2.0 wt %, Cu: 0.10 wt %, Al: extremely small amount; remainder including Fe and other unavoidable impurities), and held under 0.85 MPa for one day. Subsequently, the alloy was held under 0.2 MPa for one day while being cooled by liquefied Ar to induce hydrogen cracking to thereby obtain a coarse alloy powder.

<Fine Pulverization>

The hydrogen-cracked coarse alloy powder was input into a ball mill having a tank volume of 0.8 L (product name: Attritor 0.8 L, manufactured by Nippon Coke & Engineering Co., Ltd.), while mixing 1.5 kg of Zr beads (2φ) with 100 weight parts of the powder, and pulverized at a rotational speed of 500 rpm for 2 hours. During the pulverization, benzene was added in an amount of 10 weight parts as a pulverization aid, and liquefied Ar was used as a solvent.

<Kneading>

6.7 weight parts of 1-octadecene and 57 weight parts of a toluene solution (7 weight %) of polyisobutylene (PIB) B150 were added to 100 weight parts of the pulverized alloy particles, and, after removing toluene under stirring conditions including pressure reduction and heating at 70° C. using a mixer (device name: TX-0.5, manufactured by INOUE MFG. Inc.), further subjected to kneading using the mixer for 2 hours to prepare a clayey composite material.

<Magnetic Field Orientation>

Figure 10A:
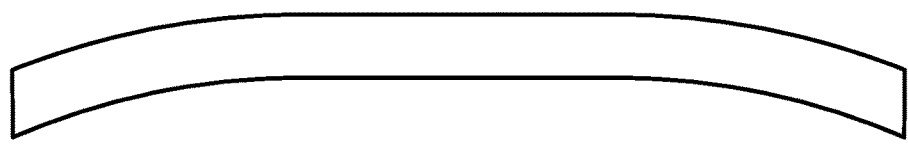
FIG. 10(a) is a diagram depicting a cavity shape of a shaping mold used in Example 1 pertaining to the present invention, wherein the mold is used during application of an external magnetic field.
Figure 10B:
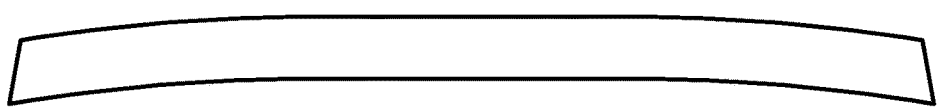
FIG. 10(b) is a diagram depicting a cavity shape of a shaping mold used in Example 1 pertaining to the present invention, wherein the mold is used during application of an external magnetic field, wherein the mold is used as an intermediate shaping mold.

The composite material prepared in the kneading step was set in a mold made of stainless steel (SUS) and formed with a cavity having the same shape as that depicted in FIG. 10(*a*) to thereby form a first shaped body, and then the first shaped body was subjected to orientation treatment by applying a parallel magnetic field thereto from the outside using a superconducting solenoid coil (device name: JMTD-12T100, manufactured by JASTEC). This orientation treatment was performed by applying an external magnetic field of 12 T, at 80° C. for 10 minutes, wherein the external magnetic field was applied in parallel to a thickness direction of a trapezoidal shape, i.e., a direction along the shortest side of the trapezoidal shape. The composite material was extracted from the solenoid coil while being kept at the temperature for the presentation treatment, and then subjected to demagnetization treatment by applying a reverse magnetic field thereto. The application of the reverse magnetic field was performed by gradually reducing a magnetic field intensity toward a zero magnetic field, specifically by changing the magnetic field intensity from −0.2 T to +0.18 T and then to −0.16 T.

<Deformation Step>

Figure 10C:
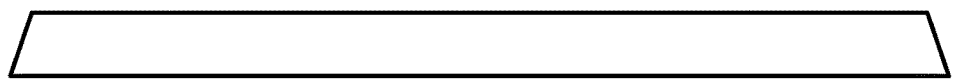
FIG. 10(c) is a diagram depicting a cavity shape of a shaping mold used in Example 1 pertaining to the present invention, wherein the mold is used as a final shaping mold.

After the orientation treatment, a shaping sheet piece of the shaped composite material was extracted from the mold for the orientation treatment, and placed in an intermediate shaping mold made of stainless steel (SUS) and formed with a cavity (FIG. 10(*b*)), wherein an arc shape of each end of the cavity is shallower than an arc shape of each end of the cavity depicted in FIG. 10(*a*). In this state, deformation treatment was performed by pressing the shaping sheet piece under heating at 60° C. The shaping sheet piece after being subjected to shaping was extracted, and placed in a final shaping mold made of stainless steel (SUS) and formed with a cavity having a shape depicted in FIG. 10(c). In this state, deformation treatment was performed by pressing the sheet piece under heating at 60° C. After the deformation, the sheet-shaped composite material was extracted from the SUS mold, and inserted into a graphite mold having a cavity with the same shape as that in FIG. 10(c). A widthwise dimension (i.e., a dimension in a direction orthogonal to the drawing sheet surface of FIG. 10(c)) of the cavity of the graphite mold was greater than a widthwise dimension of the shaped compound having a trapezoidal shape, by about 20 mm. The composite material was inserted to be located in a central region of the cavity. As a release agent, a BN (boron nitride) powder was preliminarily applied to the graphite mold.

<Deoiling Step>

The compound inserted in the graphite mold was subjected to deoiling treatment in a vacuum atmosphere. A rotary pump was used as an evacuation pump, and the compound was heated from room temperature to 100° C. at a temperature rising speed of 0.9° C./min, and held at 100° C. for 40 hour. Through this step, oil components such as orientational lubricant and plasticizer could be removed by volatilization.

<Calcination (Decarbonization) Step>

The deformed shaping sheet piece was subjected to decarbonization treatment in a hydrogen atmosphere pressurized at 0.8 MPa. In this treatment, the sheet piece was heated from room temperature to 400° C. at a temperature rising speed of 6.3° C./min, and held at 400° C. for 2 hour. A flow rate of hydrogen in this treatment was in the range of 2 to 3 L/min.

<Sintering>

After the decarbonization treatment, a pressing die made of graphite and having the same cross-sectional shape as that in FIG. 10(c) is inserted into the graphite mold, and pressure sintering was performed in a vacuum atmosphere by applying a pressing pressure to the pressing die. A pressing direction was a direction perpendicular to orientation directions of the easy magnetization axes, i.e., a direction parallel to the width direction of the sheet piece of the composite material. During sintering, the sheet piece was heated to 700° C. at a temperature rising speed of 22.7° C./min, under application of a pressing pressure of 50 kgf as an initial load, and then heated to 950° C. as a final sintering temperature at a temperature rising speed of 8.3° C./min, under application of a pressing pressure of 50 kgf. Then, sheet piece was held at 950° C. for 5 min.

<Annealing>

A sintered body obtained in the sintering step was heated from room temperature to 500° C. by taking a time of 0.5 hours and then held at 500° C. for one hour. Then, the sintered body was subjected to annealing by means of rapid cooling, to obtain a rare-earth permanent magnet-forming sintered body.

<Measurement of Orientation Axis Angle>

After subjecting the obtained sintered body to polishing using a SiC paper, buffing, and surface processing by milling, orientation axis angles of easy magnetization axes in the sintered body were measured with respect to a surface of the sintered body, using a scanning electron microscope (SEM) (device name: JSM-7001 F, manufactured by JEOL) equipped with an EBSD (Electron Backscatter Diffraction) detector (device name: AZtecHKL EBSD NordlysNano Integrated, manufactured by Oxford Instruments). Alternatively, for this measurement, it is possible to use an electron scanning microscope (Supra 40VP manufactured by ZEISS) equipped with an EBSD detector (Hikari High Speed EBSD Detector) manufactured by EDAX. EBSD analysis was performed at a view angle of 35 μm and a pitch of 0.2 μm. In order to improve analytical accuracy, the analysis was performed with respect to a region covering at least 30 sintered particles.

Figure 11:
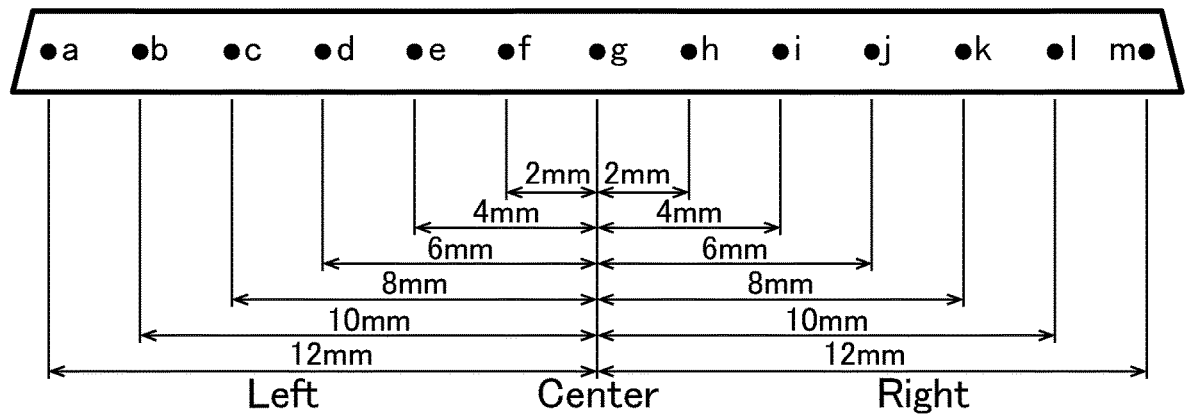
FIG. 11 is a diagram indicating positions at which measurement of orientation angles of easy magnetization axed in a sintered body obtained in Example 1.

In Example 1, a trapezoidal magnet as the sintered body was cut along a widthwise center line, and a lengthwise section as a cross-section of the magnet was subjected to measurement. Measurement positions are illustrated in FIG. 11. The measurement was performed along a center line of the cross-section in a thickness direction, at total twelve positions: a position (a) leftwardly away from a lengthwise center by 12 mm; a position (b) leftwardly away from the lengthwise center by 10 mm; a position (c) leftwardly away from the lengthwise center by 8 mm; a position (d) leftwardly away from the lengthwise center by 6 mm; a position (e) leftwardly away from the lengthwise center by 4 mm; a position (f) leftwardly away from the lengthwise center by 2 mm; a position (g) at the lengthwise center; a position (h) rightwardly away from the lengthwise center by 2 mm; a position (i) rightwardly away from the lengthwise center by 4 mm; a position (j) rightwardly away from the lengthwise center by 6 mm; a position (k) rightwardly away from the lengthwise center by 8 mm; a position (l) rightwardly away from the lengthwise center by 10 mm; and a position (m) rightwardly away from the lengthwise center by 12 mm.

Figure 12:
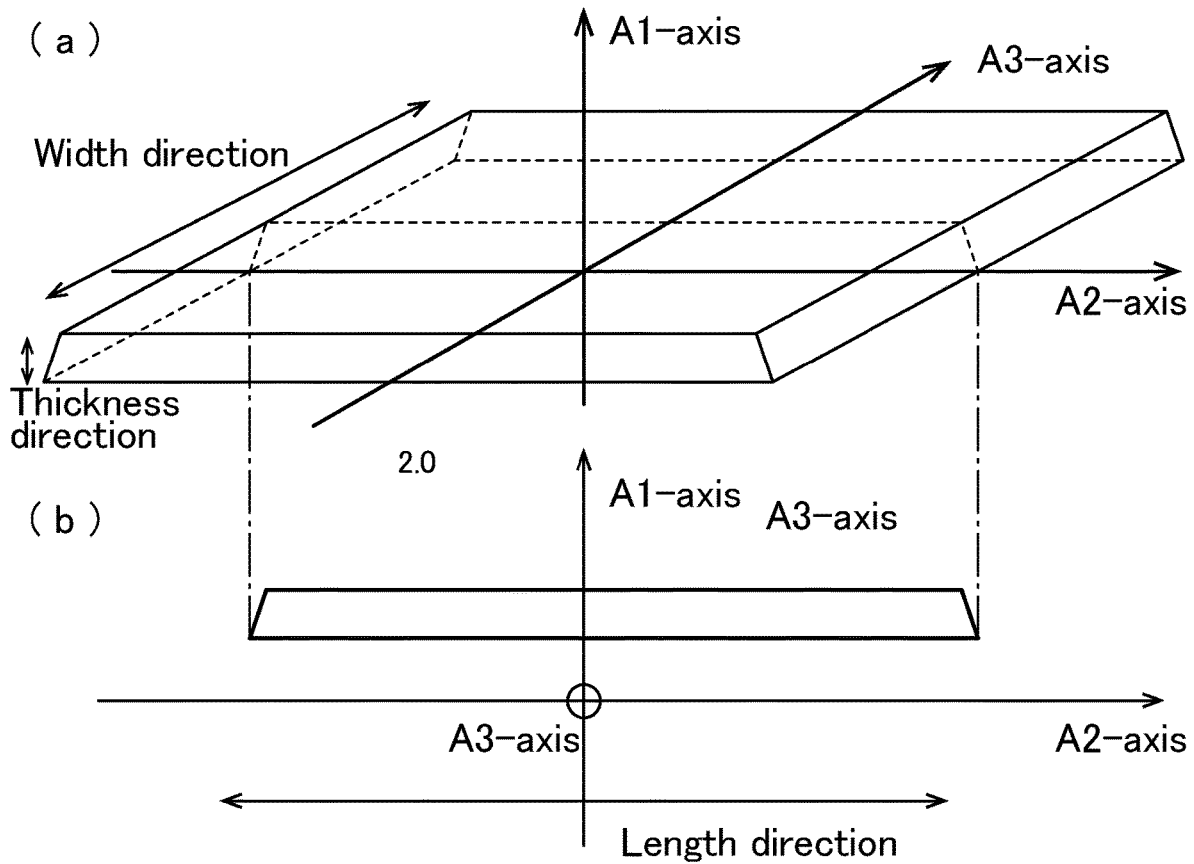

At each of the measurement positions, a direction toward which easy magnetization axes, i.e., the crystal axes C (001), are most frequently oriented was defined as an orientation axis angle at the measurement position. As depicted in FIG. 12, orthogonal coordinates consisting of an A2-axis and an A3-axis orthogonal to the A2-axis are set in a base of the trapezoid. Using a plane including the orthogonal coordinates as a reference plane, an A1-axis orthogonal to the A2-axis and A3-axis is set in a thickness direction, and a deviation angle α of the orientation axis from the A1-axis toward the A3-axis and a deviation angle θ+β of the orientation axis from the A1-axis toward the A2-axis.

At any of the analytical positions in a plane including the A1-axis and the A2-axis, given orientation directions of easy magnetization axes lie within the plane including the A1-axis and the A2-axis. Thus, an inclination angle α corresponds to a displacement from the given orientation direction of each easy magnetization axis, i.e., "deviation angle". Further, the angle θ used in association with the angle β is an angle between a designed orientation direction of an easy magnetization axis and the A1-axis at an arbitrary analytical position. Thus, the angle β is a displacement of the orientation axis at this analytical position, with respect to the given orientation direction, i.e., "deviation angle". A result of evaluation obtained in Example 1 is presented in Table 1.

TABLE 1

| | Measurement position | Orientation Axis Angle | | | | | | |
|---|---|---|---|---|---|---|---|---|
| | | θ (°) | θ + β (°) | θ (°) | β (°) | P (mm) | L (mm) | P/L |
| Example 1 | a | 0 | 27 | 30 | −3 | 8 | 25 | 0.32 |
| | b | 0 | 20 | 22.5 | −2.5 | | | |
| | c | −5 | 19 | 15 | 4 | | | |
| | d | −5 | 10 | 7.5 | 2.5 | | | |

TABLE 1-continued

| Measurement position | Orientation Axis Angle | | | | P (mm) | L (mm) | P/L |
|---|---|---|---|---|---|---|---|
| | θ (°) | θ + β (°) | θ (°) | β (°) | | | |
| e | −5 | 0 | 0 | 0 | | | |
| f | −7 | 0 | 0 | 0 | | | |
| g | 0 | 0 | 0 | 0 | | | |
| h | −3 | 0 | 0 | 0 | | | |
| i | −3 | −3 | 0 | −3 | | | |
| j | 0 | −10 | −7.5 | −2.5 | | | |
| k | −3 | −15 | −15 | 0 | | | |
| l | −3 | −25 | −22.5 | −2.5 | | | |
| m | 0 | −30 | −30 | 0 | | | |

Figure 13:
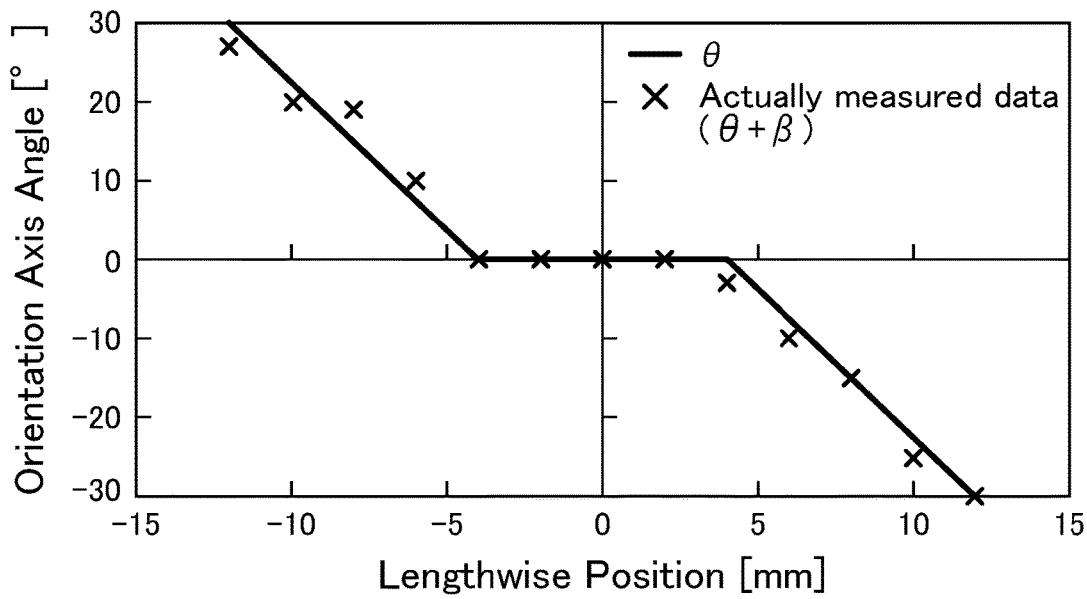
FIG. 13 is a graph presenting deviations from design values of orientation angles of easy magnetization axes in Example 1.

In a central region (measurement positions e, f, g, h, i), easy magnetization axes of the magnet material particles included in the central region are oriented in directions substantially orthogonal to one surface of a portion of the sintered body extending in the width direction thereof, and, in one or each of first and second end regions (measurement positions a, b, c, d, j, k, l, m), easy magnetization axes of the magnet material particles included in the end region are oriented in directions along which they are converged such that a density of the magnet material particles whose easy magnetization axes are directed toward the one surface becomes greater in the end region than in the central region.

β, i.e., a "deviation angle" from θ which is a design value of the orientation axis angle, is small at any of the measurement positions, which shows that orientation axis angles conforming to the design values could be obtained (FIG. 13).

In this rare-earth permanent magnet-forming sintered body, the ratio P/L of the lengthwise dimension P of the central region to the lengthwise dimension L of the first surface was 0.32. Further, an angle between the lengthwise edge surface and the first surface was 70°, and, at a position adjacent to the lengthwise edge surface, the easy magnetization axis extends along the inclination angle of the edge surface, i.e., is inclined with respect to the first surface.

The edge surface of the rare-earth permanent magnet-forming sintered body may be polished to enable respective inclination angles of the easy magnetization axis at positions adjacent to the edge surface to become substantially equal to each other.

LIST OF REFERENCE SIGNS 1, 101: rare-earth permanent magnet-forming sintered body
2, 102: upper side
3, 103: lower side
4, 5, 104, 105: edge surface
6, 106: central region
7, 8, 107, 108: end region
20: electric motor
21: rotor core
21a: outer peripheral surface
22: air gap
23: stator
23a: teeth
23b: field coil
24: magnet-insertion slot
24a: linear central section
24b: inclined section
30: rare-earth permanent magnet
117: compound
118: support substrate
119: green sheet
120: slot-die
123: processing sheet piece
125: sintering sheet piece
C: easy magnetization axis
θ: inclination angle

The invention claimed is:

1. A rare-earth permanent magnet-forming sintered body comprising particles of a magnet material containing a rare-earth substance, the magnet material particles being integrally sintered while being formed into a given three-dimensional shape with a lengthwise cross-section having a first surface extending in a length direction thereof, a second surface lying at a distance from the first surface in a thickness direction thereof and extending in the length direction, and edge surfaces of lengthwise opposite ends thereof, each of the edge surfaces being inclined to extend from a corresponding lengthwise edge of the first surface obliquely outwardly in the length direction, whereby a length of the first surface becomes less than that of the second surface,
wherein the rare-earth permanent magnet-forming sintered body is sectionalized into at least a lengthwise central region, and first and second end regions located, respectively, on both sides of the central region,
wherein:
in the central region, easy magnetization axes of the magnet material particles included in the central region have a parallel orientation in which the easy magnetization axes are oriented in a direction substantially orthogonal to the first surface of the sintered body extending in the length direction; and
in each of the first and second end regions, easy magnetization axes of the magnet material particles included in the end region are oriented such that: at a position adjacent to the edge surface, they are directed toward the first surface while being inclined with respect to the first surface at an angle conforming to an inclination angle of the edge surface; at a position adjacent to the central region, they are directed toward the first surface in a direction substantially orthogonal to the first surface; and, at a position between the edge surface and the central region, they are converged in such a manner as to be directed toward the first surface at an inclination angle which gradually increases in a direction from the edge surface toward the central region, and
wherein a ratio P/L of a lengthwise dimension P of the central region to a lengthwise dimension L of the first surface is in the range of 0.05 to 0.8.

2. The rare-earth permanent magnet-forming sintered body as recited in claim 1, wherein the edge surface in each of the first and second end regions is inclined with respect to the first surface, such that an angle between an extension of the edge surface and the first surface falls within the range of 45° to 80°.

3. The rare-earth permanent magnet-forming sintered body as recited in claim 1, wherein the edge surface in each of the first and second end regions is inclined with respect to the first surface, such that an angle between an extension of the edge surface and the first surface falls within the range of 55° to 80°.

4. The rare-earth permanent magnet-forming sintered body as recited in claim 1, wherein the ratio P/L of a lengthwise dimension P of the central region to a lengthwise dimension L of the first surface is in the range of 0.2 to 0.5.

5. The rare-earth permanent magnet-forming sintered body as recited in claim 1, wherein the ratio P/L of a lengthwise dimension P of the central region to a lengthwise dimension L of the first surface is in the range of 0.3 to 0.4.

6. The rare-earth permanent magnet-forming sintered body as recited in claim 1, wherein the magnet material is an Nd—Fe—B based magnet material.

7. A rare-earth permanent magnet formed by magnetizing the rare-earth permanent magnet-forming sintered body as recited in claim 1.

8. A rotary machine comprising a rotary shaft, a stator, and a rotor core rotatably disposed inside the stator and in opposed relation to the stator through an approximately hollow cylindrical-shaped air gap having a central axis parallel to the rotary shaft, wherein: the rotor core is formed with a plurality of slots each having a lengthwise cross-section with a lengthwise dimension and a thicknesswise dimension and extending in an axial direction, the slots being arranged at positions spaced apart from each other in a circumferential direction of the rotor core; and the rare-earth permanent magnet as recited in claim 7, the rare-earth permanent magnet being disposed inside each of the slots.

9. The rotary machine as recited in claim 8, wherein the lengthwise dimension of each of the slots is set to be greater than a lengthwise dimension of the rare-earth permanent magnet disposed in the slot, so as to form a void space by the slot around each of the longitudinally opposite ends of the rare-earth permanent magnet disposed inside the slot.

10. The rotary machine as recited in claim 8, wherein the void space extends in a direction toward the air gap with an inclination with respect to a portion of the slot receiving therein the permanent magnet.

\* \* \* \* \*